United States Patent
Chen et al.

(10) Patent No.: US 11,248,772 B2
(45) Date of Patent: Feb. 15, 2022

(54) COLOR MIXING FROM DIFFERENT LIGHT SOURCES

(71) Applicants: Chia Ming Chen, Cambridge, MA (US); Marian Heman-Ackah, Cambridge, MA (US); Yu Mo, Cambridge, MA (US); Hemanth Kiran Gutti, Cambridge, MA (US); Huikai Xie, Gainesville, FL (US); Jessica Han, Cambridge, MA (US); Albert DC Chen, Cambridge, MA (US)

(72) Inventors: Chia Ming Chen, Cambridge, MA (US); Marian Heman-Ackah, Cambridge, MA (US); Yu Mo, Cambridge, MA (US); Hemanth Kiran Gutti, Cambridge, MA (US); Huikai Xie, Gainesville, FL (US); Jessica Han, Cambridge, MA (US); Albert DC Chen, Cambridge, MA (US)

(73) Assignee: E-GREEN LLC, Cambridge, MA (US)

(*) Notice: Subject to any disclaimer, the term of this patent is extended or adjusted under 35 U.S.C. 154(b) by 0 days.

(21) Appl. No.: 16/961,412

(22) PCT Filed: Jan. 18, 2019

(86) PCT No.: PCT/US2019/014145
§ 371 (c)(1),
(2) Date: Jul. 10, 2020

(87) PCT Pub. No.: WO2019/143903
PCT Pub. Date: Jul. 25, 2019

(65) Prior Publication Data
US 2020/0355346 A1    Nov. 12, 2020

Related U.S. Application Data

(60) Provisional application No. 62/784,367, filed on Dec. 21, 2018, provisional application No. 62/768,072, (Continued)

(51) Int. Cl.
*F21V 7/04* (2006.01)
*H05B 45/20* (2020.01)
(Continued)

(52) U.S. Cl.
CPC .............. *F21V 7/041* (2013.01); *F21S 8/065* (2013.01); *F21V 5/045* (2013.01); *F21V 7/0066* (2013.01);
(Continued)

(58) Field of Classification Search
CPC ...... F21V 7/041; F21V 33/0056; F21V 14/02; F21V 23/0435
See application file for complete search history.

(56) References Cited

U.S. PATENT DOCUMENTS 3,322,025 A    5/1967    Dauser
4,233,654 A    11/1980    Tsuchihashi et al.
(Continued)

FOREIGN PATENT DOCUMENTS

WO    2018005906    1/2018

OTHER PUBLICATIONS

International Search Report and Written Opinion dated May 23, 2019 issued in corresponding International Application No. PCT/US19/14145.

*Primary Examiner* — William N Harris
(74) *Attorney, Agent, or Firm* — Onello & Mello, LLP

(57) ABSTRACT

A color mixing light system comprises a pyramidal mirror assembly comprising three or more mirrors constructed and
(Continued)

arranged in a pyramid structure and three or more color light sources. The pyramidal mirror assembly divides the light beams from the color light sources so that a first portion is reflected by the mirrors and a second portion extends beyond the mirrors to collectively form a multicolor pattern comprising plurality of overlapping color regions on a surface.

20 Claims, 24 Drawing Sheets

Related U.S. Application Data filed on Nov. 15, 2018, provisional application No. 62/715,246, filed on Aug. 6, 2018, provisional application No. 62/677,188, filed on May 29, 2018, provisional application No. 62/661,001, filed on Apr. 21, 2018, provisional application No. 62/618,842, filed on Jan. 18, 2018.

(51) Int. Cl.

| | | |
|---|---|---|
| *F21V 7/00* | (2006.01) |
| *F21V 14/02* | (2006.01) |
| *F21V 14/04* | (2006.01) |
| *F21V 23/00* | (2015.01) |
| *F21S 8/06* | (2006.01) |
| *F21V 23/04* | (2006.01) |
| *F21V 33/00* | (2006.01) |
| *F21V 5/04* | (2006.01) |
| *F21Y 115/10* | (2016.01) |
| *H05B 47/19* | (2020.01) |
| *H05B 47/18* | (2020.01) |
| *F21Y 113/13* | (2016.01) |

(52) U.S. Cl.
CPC ............... *F21V 14/02* (2013.01); *F21V 14/04* (2013.01); *F21V 23/004* (2013.01); *F21V 23/0435* (2013.01); *F21V 23/0485* (2013.01); *F21V 33/0052* (2013.01); *F21V 33/0056* (2013.01); *H05B 45/20* (2020.01); *F21Y 2113/13* (2016.08); *F21Y 2115/10* (2016.08); *H05B 47/18* (2020.01); *H05B 47/19* (2020.01)

(56) References Cited

U.S. PATENT DOCUMENTS

| | | | | |
|---|---|---|---|---|
| 5,969,868 | A | * | 10/1999 | Bornhorst ................ F21V 9/08 359/589 |
| 7,283,313 | B2 | | 10/2007 | Tamaoki et al. |
| 7,400,439 | B2 | | 7/2008 | Holman |
| 2004/0207997 | A1 | * | 10/2004 | Stewart ................... A47F 11/10 362/628 |
| 2005/0168987 | A1 | | 8/2005 | Tamaoki et al. |
| 2006/0152931 | A1 | | 7/2006 | Holman |
| 2007/0109763 | A1 | * | 5/2007 | Wolf ..................... F21V 19/006 362/86 |
| 2007/0109782 | A1 | * | 5/2007 | Wolf ................... F21V 23/0435 362/253 |
| 2012/0169254 | A1 | * | 7/2012 | Van Doorn ............ H05B 45/30 315/297 |
| 2013/0335302 | A1 | * | 12/2013 | Crane ................ G02B 27/0172 345/8 |
| 2015/0167956 | A1 | * | 6/2015 | Vaidya ................... F21V 14/02 381/92 |
| 2017/0138571 | A1 | | 5/2017 | Chen |

\* cited by examiner

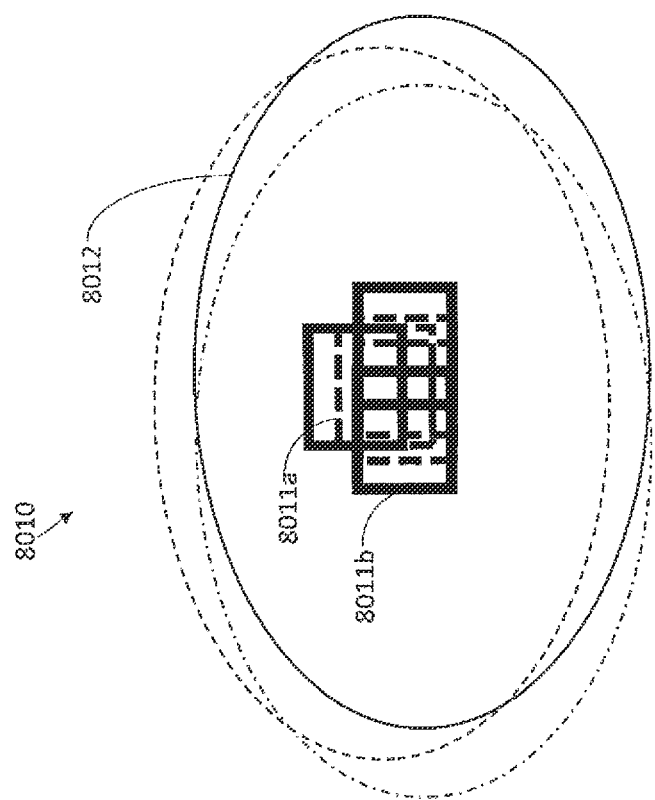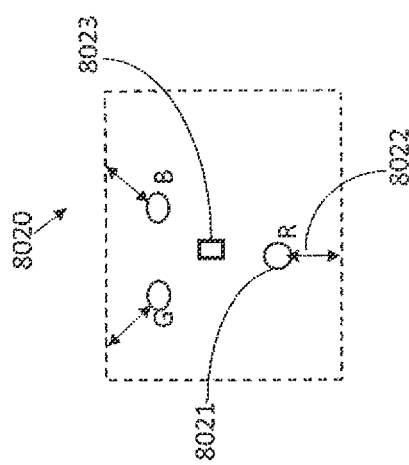
Figure 8

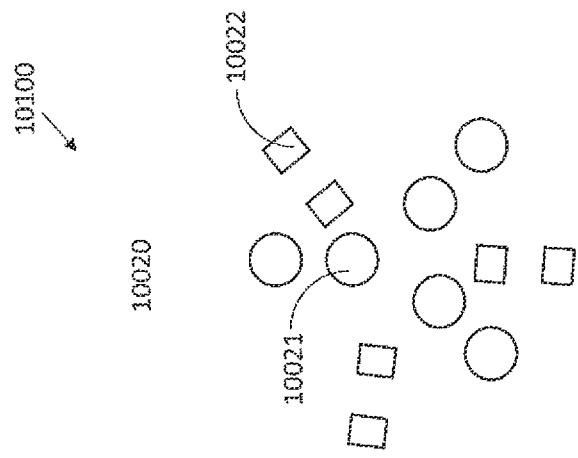
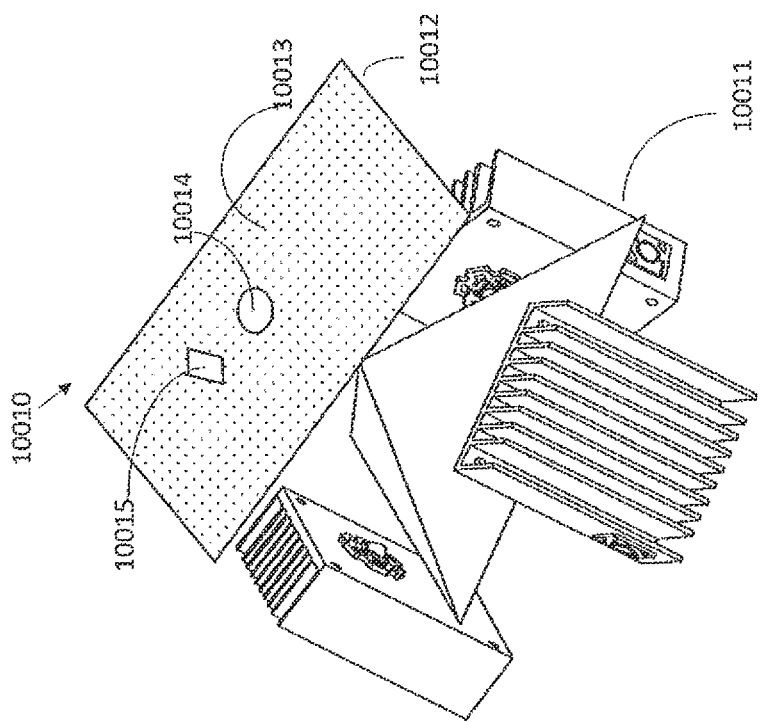
Figure 10

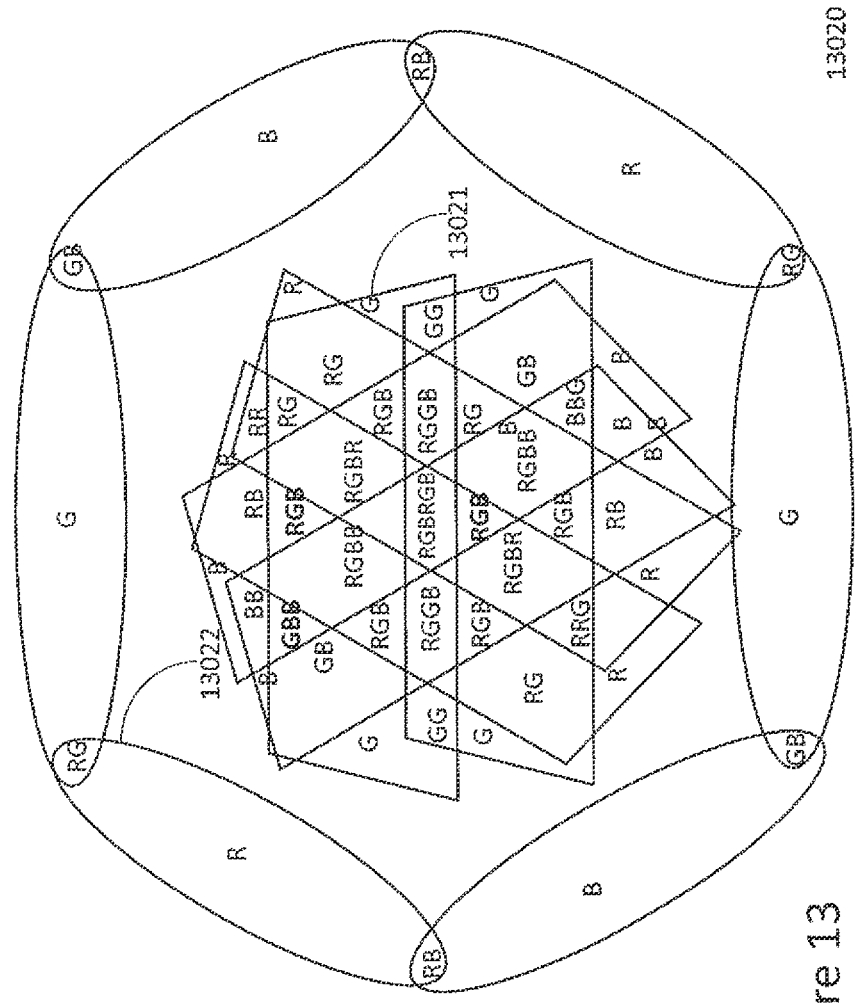
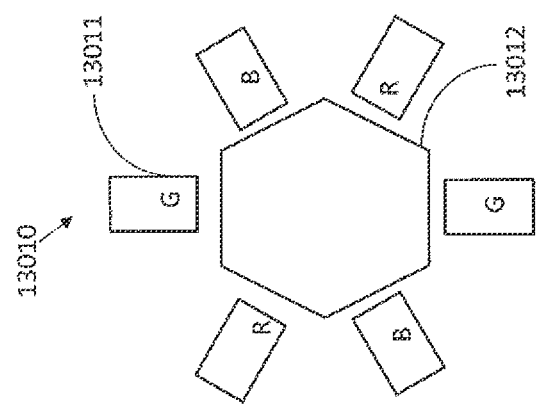
Figure 13

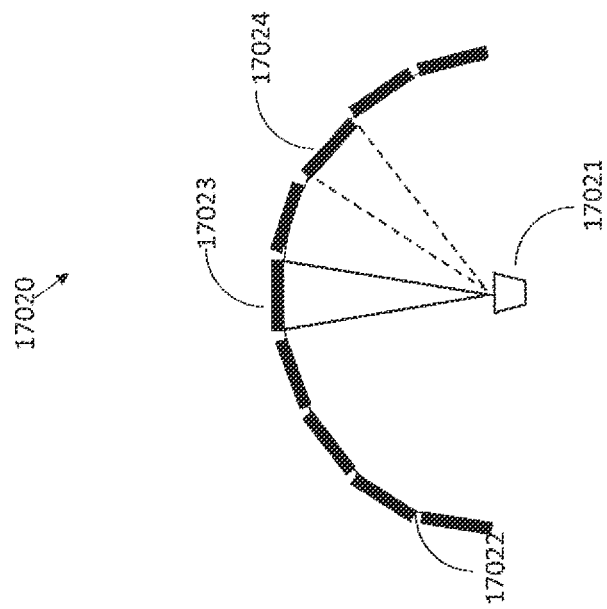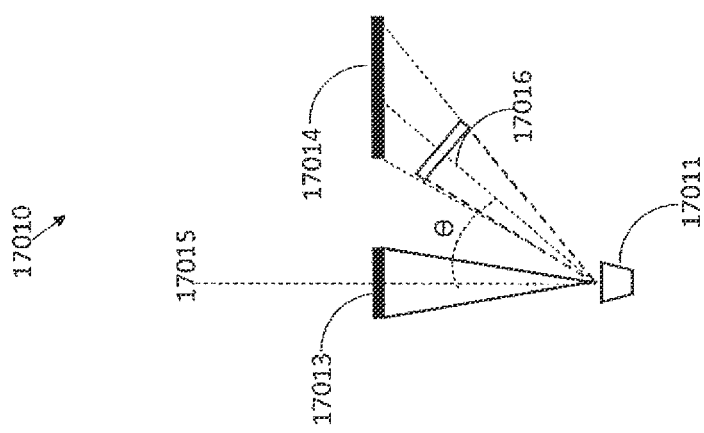
Figure 17

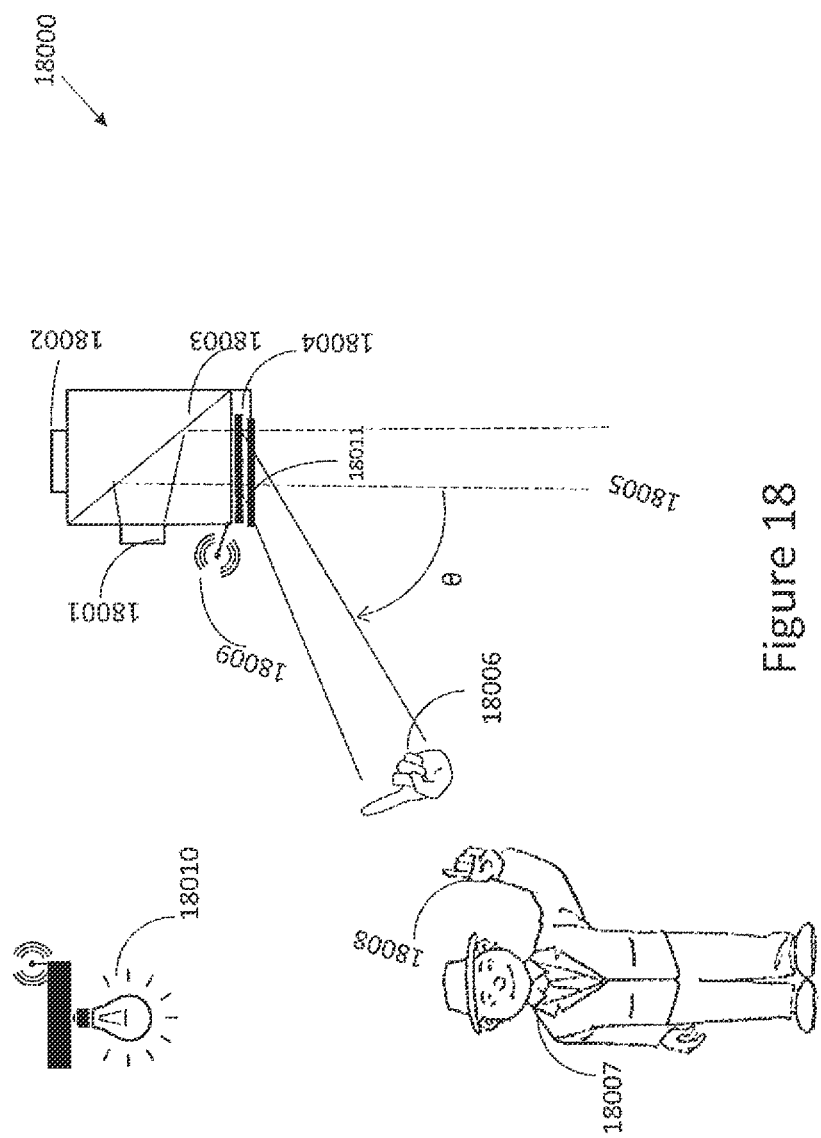

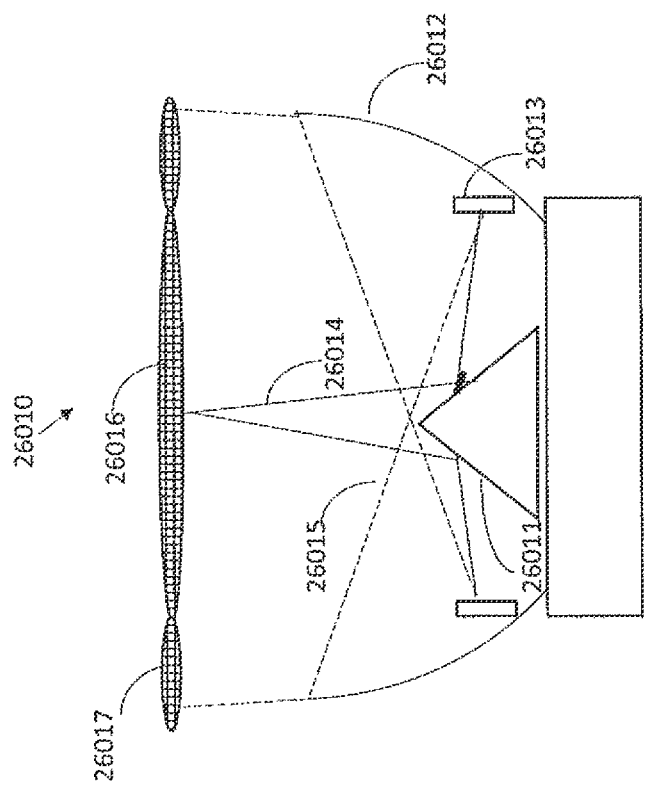

COLOR MIXING FROM DIFFERENT LIGHT SOURCES

RELATED APPLICATIONS

This application claims the benefit of U.S. Provisional Patent Application No. 62/618,842 filed on Jan. 18, 2018, entitled "Light Control Systems and Methods," U.S. Provisional Patent Application No. 62/661,001 filed on Apr. 21, 2018, entitled "Light Control Systems and Methods," U.S. Provisional Patent Application No. 62/677,188 filed on May 29, 2018, entitled "Light Control Systems and Methods," U.S. Provisional Patent Application No. 62/715,246 filed on Aug. 6, 2018, entitled "Light Control Systems and Methods," U.S. Provisional Patent Application No. 62/768,072 filed on Nov. 15, 2018, entitled "Light Control Systems and Methods," U.S. Provisional Patent Application No. 62/784,367 filed on Dec. 21, 2018, entitled "Light Control Systems and Methods," the contents of each of which is incorporated herein by reference in its entirety.

TECHNICAL FIELD

This application is related generally to color lighting arrangements, and more specifically, to methods, systems, and devices that mix light from different color LEDs.

BACKGROUND

Current schemes that include color mixing of light, for example, provided by color mixing projectors offered by Abor Scientific, includes the overlapping of three projected color circles from three red, green, and blue (RGB) light emitting diodes (LEDs) or related light sources, resulting in a color mixing pattern containing up to seven color mixing regions. However, this is not very efficient in terms of creating color mixing regions.

BRIEF SUMMARY

In one aspect, a pyramidal mirror assembly color mixing light comprises three or more mirror on a pyramid structure, three or more color light sources with heatsinks, a speaker for playing music, a circuit board that controls the operations of the color mixing light and communicates with users through wired or wireless control devices, and a power supply that supplies electricity to the circuit board. The color mixing is for a creating multicolor pattern, generating color shadows when illuminating objects, and creating color contents. The color light sources can be adjusted individually to change the colors of the multicolor pattern.

In some embodiments, three or more white light sources can be added to the pyramidal mirror assembly color mixing light for regular illumination.

In some embodiments, the mirrors are pivotable so that the shape, size, and color of the color mixing pattern can be changed.

In some embodiments, the mirrors are Micro-Electro-Mechanical Systems (MEMS) mirror arrays to control color at a pixel level so that color contents can be created.

In some embodiments, the multicolor pattern can be steered to a desired position by a beam steering mechanism such as a Fresnel prism pair.

In some embodiments, the colors of the color pattern can be controlled by music.

In some embodiments, the pyramidal mirror assembly color mixing light can be controlled by wireless devices, holographic controller, and other hand gesture controller devices.

In some embodiments, a wide beam color mixing light comprises three or more colored LEDs with heatsinks, a clear or transparent window, a speaker for playing music, a circuit board that controls the operation of the color mixing light and communicates with users through wired or wireless devices, a power supply that supplies power to the circuit board; the color LEDs can be placed on vertices of an equilateral triangle mesh configuration; the brightness of the color LEDs can be individually control to generate radiation of various mixing color; the task of the wide beam color mixing light is to generate a color mixing radiation from three or more color LEDs for illumination, generating color shadows, and creating color contents.

In some embodiments, the color LEDs and their heatsinks are driven by linear motion mechanisms to change their spacings so that the color shadows can move, change shapes and colors dynamically.

In some embodiments, the wide beam color mixing light is used in a chandelier light to create multicolor shadows from the crystals.

In some embodiments, microshutter arrays or liquid crystal attenuator arrays or other light attenuator arrays can be placed over the color LEDs for generating color contents. In some embodiments, the microshutter array or the liquid crystal attenuator arrays can be constructed on a geodesic dome structure to mitigate the pixel elongation effect for edge pixels.

In some embodiments, the output color of the wide beam color mixing light can be controlled by the music played on its speaker.

In some embodiments, the wide beam color mixing light is controlled by wireless devices, holographic controller, and other hand gesture controller devices.

In other aspect, a narrow beam color mixing light comprises of three or more color LEDs with heatsinks, a speaker for playing music, a clear window, a beam steering mechanism for steering the multicolor pattern, a circuit board that controls the operation of the color mixing light, a power supply for supplying power to the color mixing light; the color light sources can be adjusted individually to create different colors for the multicolor pattern; the task of the narrow beam color mixing light is to provide a steerable, deformable, and color changing multicolor pattern and to create color shadows.

In some embodiments, the color LEDs with their heatsinks move back and forth by linear motion mechanism for changing shape, color, and size of the multicolor pattern.

In some embodiments, microshutter arrays or liquid crystal attenuator arrays or other light attenuator arrays can be placed over the color LEDs for generating color contents.

In some embodiments, the narrow beam color mixing light is controlled by wireless devices, holographic controller, and other hand gesture controller devices.

In some embodiments, geodesic microshutter arrays or geodesic liquid crystal attenuator arrays or other geodesic light attenuator arrays can be placed in front of the color LEDs for color mixing light to create color contents.

In some embodiments, an aperture plate with various aperture shape is positioned on the aperture of color mixing lights to create multicolored projections.

In another aspect, a holographic controller comprises a holographic projector device that projects a holographic control panel, a camera that captures user's hand gesture to identify user's control command, a beam splitter that brings the camera FOV and holographic controller FOV in the same direction so that the user can see the holographic control panel and place the hand gesture at the same place, a processor for processing hand gesture image and identifying control command.

In another aspect, a color mixing light system comprises a pyramidal mirror assembly comprising three or more mirrors constructed and arranged in a pyramid structure; and three or more color light source modules, wherein the pyramidal mirror assembly divides the light beams from the color light source modules so that a first portion is reflected by the mirrors and a second portion extends beyond the mirrors to collectively form a multicolor pattern comprising plurality of overlapping color regions on a surface.

In some embodiments, the color mixing light system further comprises a controller that controls an operation of the color mixing light and provides communications between the color mixing light system and remote control mobile devices via wired or wireless network.

In some embodiments, the controller includes an electronic circuit that controls the color light source modules individually to change colors of the multicolor pattern.

in some embodiments, an output of the color light source modules at the pyramidal mirror assembly produces color mixing for forming the multicolor pattern and color shadows of illuminated objects at the surface.

In some embodiments, the color mixing light system further comprises three or more white light source modules added to the pyramidal mirror assembly color mixing light.

In some embodiments, the color mixing light system further comprises a controller that pivots the mirrors so that a shape, size, intensity, color, or a combination of characteristics of the color mixing pattern can be changed.

In some embodiments, the mirrors include Micro-Electro-Mechanical Systems (MEMS) mirror arrays that control a color of an output of the color light source modules at a pixel level.

In some embodiments, the color mixing light system further comprises a beam steering mechanism for steering the multicolor pattern to a desired position. In some embodiments, the beam steering mechanism includes a Fresnel prism pair.

In some embodiments, the color mixing light system further comprises an audio speaker for outputting music that controls the colors of the color pattern.

In some embodiments, the color light source modules comprises color light sources and heat sinks.

In some embodiments, a color light source module comprises a lens, a microshutter array, and a color light source.

In some embodiments, a color light source module comprises a lens and a color LED array.

In some embodiments, color mixing light system has an outer mirror that reflects the portion of light beam that misses the pyramid mirror toward the center region to increase color mixing regions.

In some embodiments, the color mixing light system is controlled by at least one of a wireless devices, a holographic controller, or other hand gesture controller device.

In another aspect, a wide beam color mixing light comprises three or more color LED modules with heatsinks; a clear or transparent window; a speaker for playing music; a circuit board that controls the operation of the color mixing light and communicates with users through wired or wireless devices; and a power supply that supplies power to the circuit board, wherein the color LED modules are positioned on vertices of an equilateral triangle mesh configuration.

In some embodiments, the brightnesses of the color LED modules are individually controlled to generate radiation of various mixing color, and wherein a task of wide beam color mixing light includes generating a color mixing radiation from the color LED modules for illumination, generating color shadows, and creating color contents.

In some embodiments, the color LED modules and heatsinks are driven by linear motion mechanisms to change their spacings so that the color shadows can move, change shapes and colors dynamically.

In some embodiments, the wide beam color mixing light is constructed and arranged for use in a chandelier light to create multicolor shadows from crystals of the chandelier light.

In some embodiments, the color LED modules further comprise color LEDs, microshutter arrays, liquid crystal attenuator arrays, or other light attenuator arrays positioned over the color LED modules for generating color contents according to a pixel level color mixing operation.

In some embodiments, the color LED modules in the wide beam color mixing light further comprise lenses, color LEDs, microshutter arrays, liquid crystal attenuator arrays, or other light attenuator arrays positioned over the color LEDs for generating color contents according to a pixel level color mixing operation.

In some embodiments, the color LED modules in the wide beam color mixing light further comprise lenses, color LED arrays for generating color contents according to a pixel level color mixing operation.

In some embodiments, the microshutter array or the liquid crystal attenuator arrays are constructed on a geodesic dome structure to mitigate the pixel elongation effect for edge pixels.

In some embodiments, the output color of the wide beam color mixing light is controlled by the music played on the speaker.

In some embodiments, the wide beam color mixing light further comprises a controller that exchanges control signals with wireless devices, a holographic controller, and other hand gesture controller devices.

In another aspect, a narrow beam color mixing light system comprises three or more color LED modules including heatsinks; a speaker for playing music; a clear window; and a beam steering mechanism for steering the multicolor pattern; and a circuit board that controls the operation of the color mixing light, wherein the color LED modules are adjusted individually to create different colors for the multicolor pattern, a narrow beam color mixing light output provides a steerable, deformable, and color changing multicolor pattern, and color shadows and produced.

In some embodiments, the color LED modules move back and forth by a linear motion mechanism for changing a shape, color, and size of the multicolor pattern.

In some embodiments, the color LED modules of the narrow beam color mixing light further comprise color LEDs, microshutter arrays, liquid crystal attenuator arrays, or other light attenuator arrays positioned over the color LED modules for generating color contents.

In some embodiments, the color LED modules in the narrow beam color mixing light further comprises color LED arrays for generating color contents.

In some embodiments, the narrow beam color mixing light system further comprises a controller that exchanges control signals with wireless devices, a holographic controller, and other hand gesture controller devices.

In some embodiments, the narrow beam color mixing light system further comprises geodesic microshutter arrays, geodesic liquid crystal attenuator arrays, or other geodesic light attenuator arrays positioned in front of the color LED modules for color mixing light to create color contents.

In some embodiments, the narrow beam color mixing light system further comprises an aperture plate with various aperture shape placed on an aperture of the color mixing lights to create multicolored projections.

In another aspect, a holographic controller comprises a holographic projector device that projects a holographic control panel, a camera that captures user's hand gesture to identify user's control command, a beam splitter that brings the camera. FOV and holographic controller FOV in the same direction so that the user can see the holographic control panel and place the hand gesture at the same place, a processor for processing hand gesture image and identifying control command.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same elements throughout the different views. The drawings are not necessarily to scale, emphasis instead being placed upon illustrating the principles of the preferred embodiments.

FIG. 8 is a drawing describing how a color shadow can be changed in a wide beam color mixing operation using linear motion mechanisms, in accordance with some embodiments.

FIG. 10 is a drawing describing how multiple color source modules in a pyramidal mirror assembly for the color mixing of light can create multicolor projections from an aperture plate with various aperture shapes, in accordance with some embodiments.

FIG. 13 is a drawing describing color mixing at a six-faced pyramidal mirror assembly for the color mixing of light, in accordance with some embodiments.

FIG. 17 is a drawing describing the effect of pixel elongation of a microshutter array in a planar format and how a geodesic dome format can mitigate the effect, in accordance with some embodiments.

FIG. 18 is a drawing of an operation of a holographic controller, in accordance with some embodiments.

FIG. 26 is a drawing illustrating outer mirrors in addition to a pyramidal mirror assembly, in accordance with some embodiments.

DETAILED DESCRIPTION OF EMBODIMENTS

Color mixing is generally obtained when light beams of different colors overlap with each other, for example, as displayed on a surface. A first approach to achieve this is to direct three individual color light sources at a same target region. A second approach is to position multiple light source modules such as color LEDs behind a common lens. Here, the projected images of the color LEDs will overlap to produce a multicolor pattern. In the first approach, the separation between the color light sources is large due to the configuration where RGB LEDs are behind a lens and pertaining to related applications such as RGB flashlights. In such applications, if a plurality of RGB flashlights are adjacent each other, the outputs will overlap almost completely, resulting in a display of "white" color on the surface, i.e. little to no other colors. In order to display a more prominent overlap of the various colors output from the flashlights, at least one flashlight is moved further apart. In configurations including RGB LEDs and a lens, the effect is provided with a much smaller separation.

The second approach can produce a compact device. However, the size of the resulting color pattern is small. Moreover, as shown in FIG. 1, a maximum of seven regions of varying colors and/or mixture of colors can be achieved.

Figure 20:
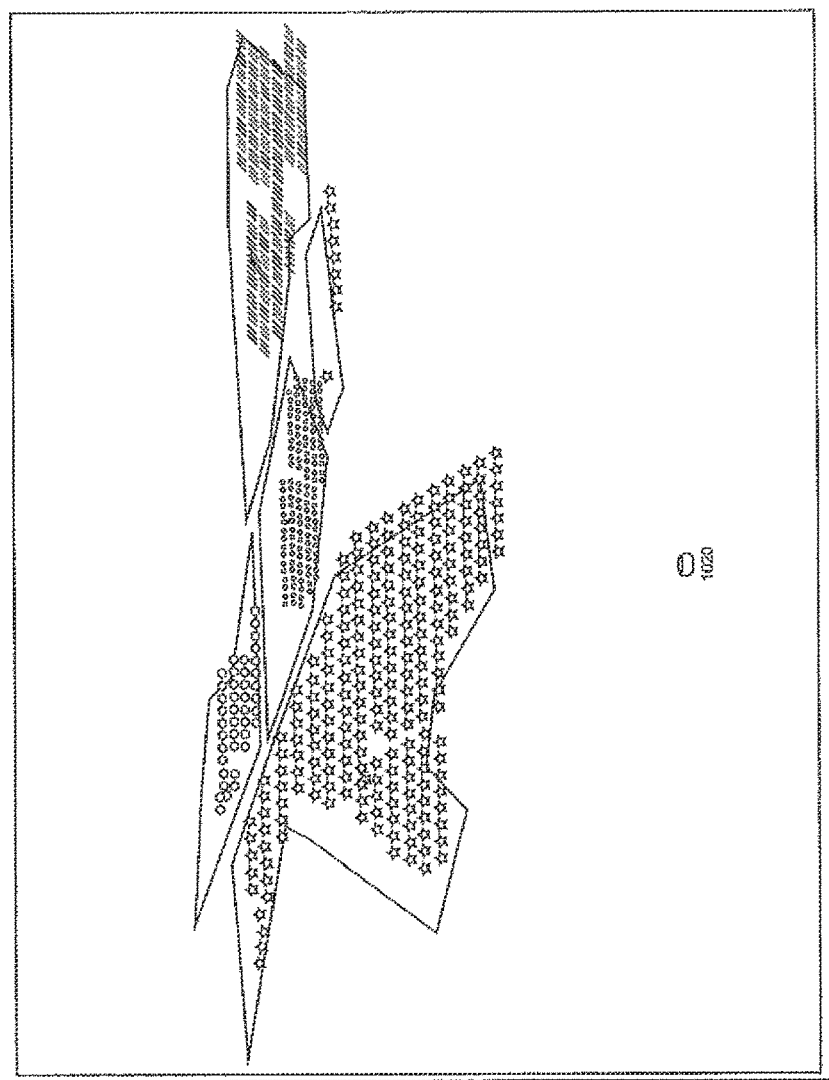
FIGS. 20-22 are photographs of a result of color mixing (color patterns), in accordance with some embodiments.
Figure 19:
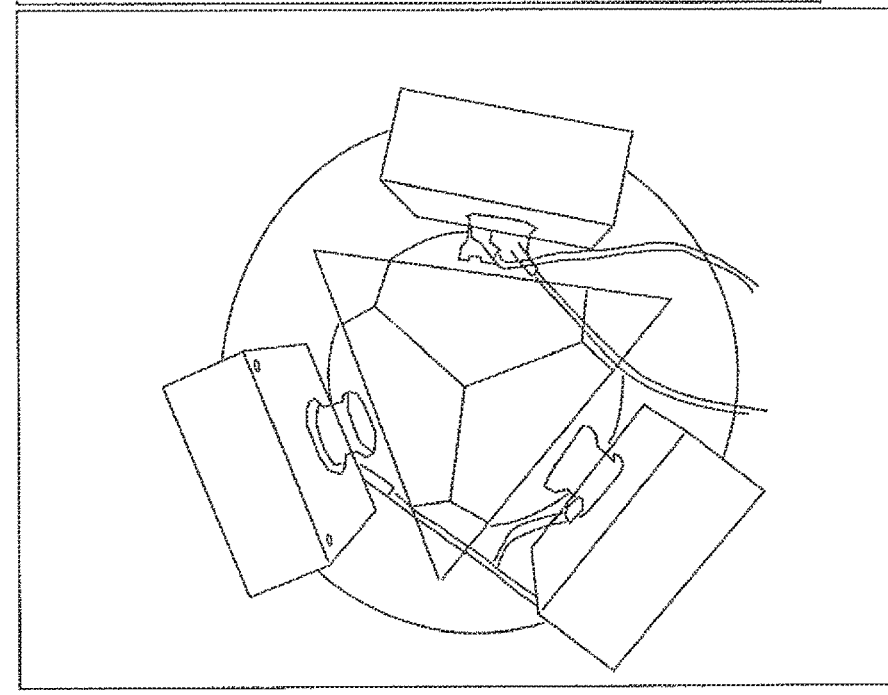
FIG. 19 is a photograph of an apparatus including the holographic controller of FIG. 18, in accordance with some embodiments.
Figure 22:
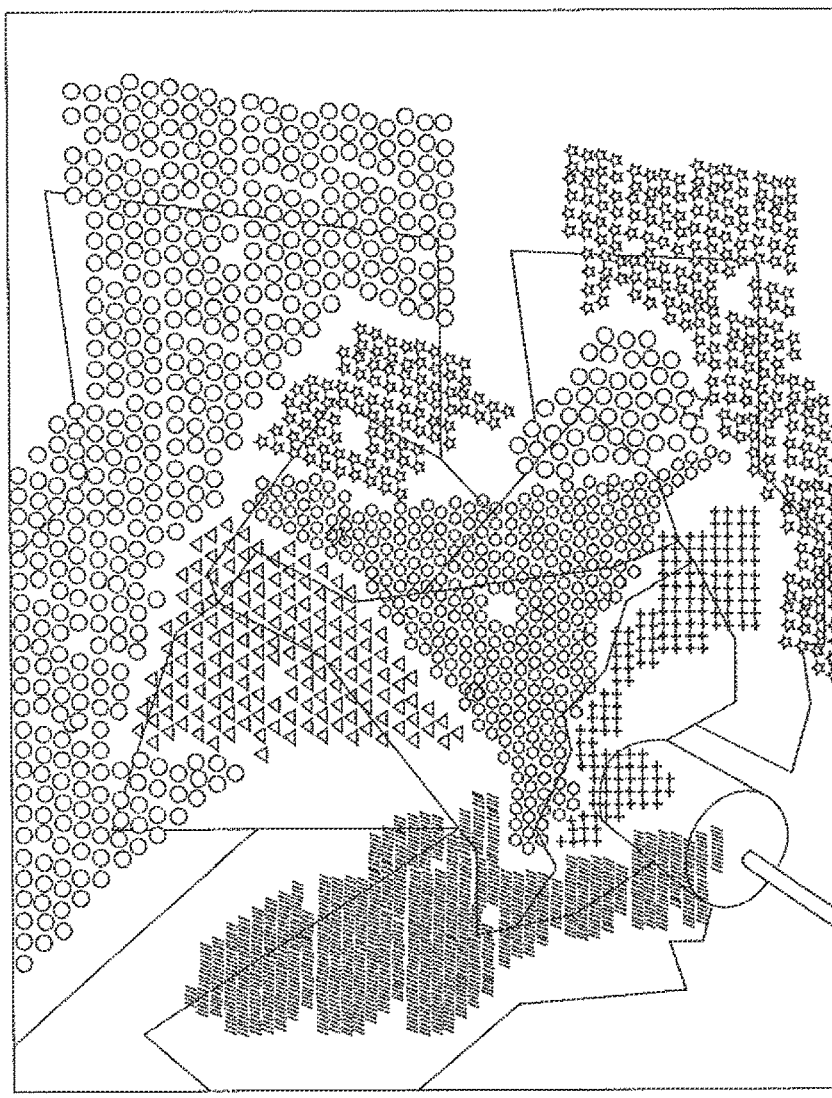
Figure 21:
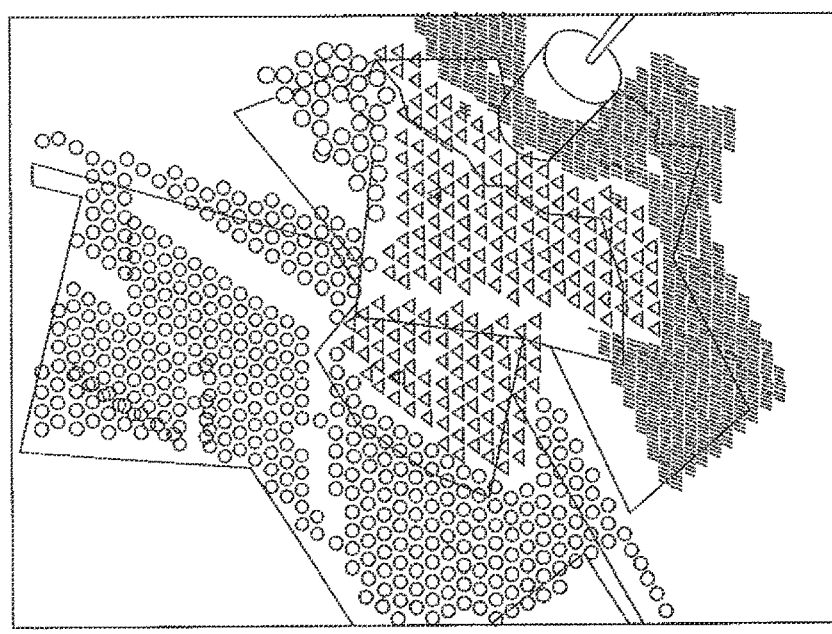
Figure 24:
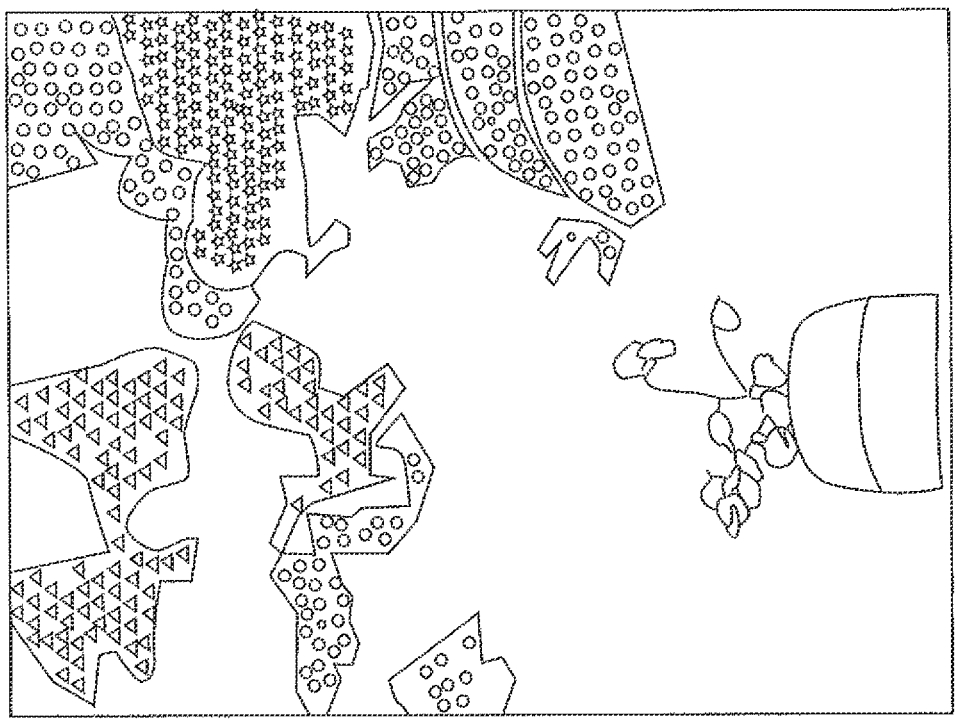
FIGS. 23 and 24 are photographs of color shadows, in accordance with some embodiment.
Figure 23:
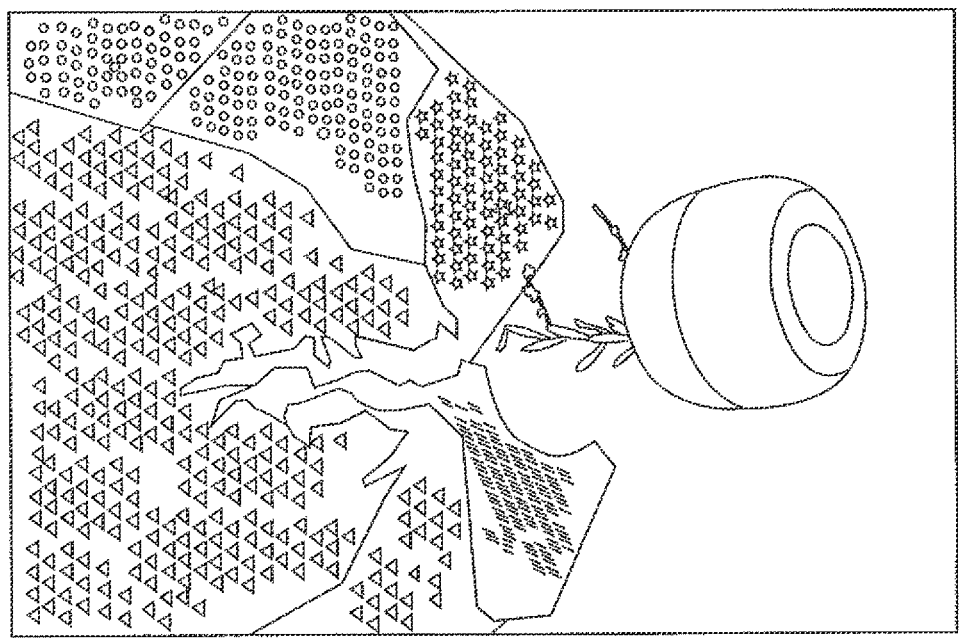

In brief overview, embodiments of the present inventive concepts provide for color mixing light systems utilizing a pyramidal mirror assembly that can mix colors from multiple color sources in a manner that produces up to sixteen color mixing regions, resulting in a colorful view for a view that is greater than twice that of a conventional light color mixing approach. Additional color regions may refer to colorful or color variations. Although the size is bigger (the previous reference to "twice" refers to the measure of colorfulness), the pyramidal mirror assembly is constructed and arranged as a three-faced pyramid that mixes light above its mirrored faces. The pyramidal mirror assembly divides the color LED light beams into two portions: a first portion reflected by the mirrors and a portion that escapes the mirrors. The second portion escaping the mirrors produces three single color regions at the outer region of the color pattern. The first portion reflected by the mirrors produces thirteen color mixing regions at the inner region of the color pattern. Examples of color patterns are illustrated in FIGS. 19 and 20. Color shadows in the color mixing regions create beautiful projections, for example, shown in FIG. 21, In some embodiments, the pyramidal mirror assembly mixing colors in this manner can be used to create art and decorate home. Because there is no lens to shrink the mixing color beam in this arrangement, pyramid color mixing of light produces wide beam color mixing, which allows for a large coverage area as compared to conventional color mixing approaches.

Accordingly, the color mixing light systems in accordance with such embodiments overcome the limitations of conventional color mixing lights, which do not have the ability to vary the size of the color mixing regions and the capability to steer the color mixing light patterns. Although color mixing lights create colorful color variations, they does not have the ability to create color contents such as a colorful flower. Also, applications may be provided to museums or other venues where color mixing lights may create color shadows, while also providing an ability to move and change the shadows In some embodiments, the brightness of each color LED can vary to generate different color mixing patterns. In some embodiments, white light can be added to the pyramidal mirror assembly color mixing light so that users can use regular illumination, for example, for reading or other activities common offered when traditional light bulbs are used, and enjoy the beautiful color pattern at the same time. For example, a viewer may enjoy the aesthetics offered by the color pattern while also relying on the white light to read books in a dark room, etc. In some embodiments, an audio device such as a speaker or the like can be added to a system that includes the pyramidal mirror assembly so that music can be played and light emitted from multiple light sources such as LEDs can be controlled at the same time. In some embodiments, a beam steering mechanism such as a Risley Fresnel prism pair can be added to the light so that the resulting color mixing pattern can be steered to any desired location. For example, a user can place the pyramidal mirror assembly color mixing light at the corner of a room for projecting the color mixing pattern at the center of the ceiling. In some embodiments, the mirrors in the pyramidal mirror assembly color mixing light can be pivotable so that the color pattern can be changed dynamically. In some embodiments, the pyramidal mirror assembly includes a MEMS mirror array. This not only allow the color pattern to be changed dynamically but also control the color mixing in a small pixel scale. Here, color content can be created in that an image of an object of relative complexity with color details can be generated, for example, a flower.

The pixelization of color mixing allows users to create color contents such as a colorful flower in some embodiments. In some embodiment, the pyramidal mirror assembly includes more than three mirrors for color mixing operations, resulting in additional color mixing regions. For a pyramidal mirror assembly with six mirrors can produce up to 51 color mixing regions.

Color light mixing can be divided into two categories: narrow beam and wide beam. In narrow beam color mixing configurations, color beams of limited beam sizes overlap. Light beams can be partially overlapped to create multiple color mixing regions. If the color light sources, e.g., LEDs, are very close, they can be nearly completely overlapped. The narrow beam color mixing can be obtained by three narrow beam color light sources usually RGB, or 3 color LEDs with a common lens. The projected color light beams from the color LEDs overlap to create color mixing regions. Up to seven color mixing regions can be created. In some embodiment, more than three color LEDs can be used to create even more color mixing regions. The resulting color mixing pattern is more colorful. For a six color LEDs configurations, for example, shown in FIG. 11, the color mixing regions increases to 19 regions, which is almost 3 times more colorful than a three color LEDs configuration. In some embodiments, the brightness of individual LEDs can be adjusted independently to change the color mixing pattern. In some embodiments, linear motion mechanism can be attached to a color LED-heatsink assembly in the LEDs-lens configuration such that the separation between color LEDs can be adjusted dynamically. The multicolor pattern can therefore be changed dynamically. In some embodiment, the lens can be a Fresnel lens and can be placed on an x-y motorized rail to steer the color mixing pattern. The beam steering and color changing of the multicolor pattern can be used in various applications and environments such as theaters.

In wide beam color mixing, the illumination region of each light source is much larger than the separation between the color LEDs. The three color illumination regions fall on top of each other. Therefore, there is essentially one color mixing region in this configuration. That is, its color mixing pattern is single color. Some conventional configurations provide color changing lights to perform color mixing inside a lightbulb, and whereby when color light illuminates on an object, the shadow is dark not color. Accordingly, such color changing lights such as Philips® Hue lighting system, which perform color mixings inside the lightbulb, produces an output light that is a uniform single color with no color shadow. In some embodiments, a light system can perform color mixing outside the light bulb to create not only a single color light but also create color shadows. Some embodiments of the present inventive concepts provide a wide beam color mixing light that performs color mixing external to the light. When its color light shines on an object, it creates multiple color shadows. In some embodiments, the mixing color of a wide beam color mixing light can be changed dynamically by adjusting the brightness of individual LEDs independently. In some embodiments, an output light of a wide beam color mixing light can be used for illumination and create color shadows at the same time. In some embodiments, more than three color LEDs can be used to construct a wide beam color mixing light to increase the colorfulness of color shadows. In the equilateral triangle mesh configuration shown in FIG. 11 where six color LEDs are placed on its vertices, the number of color shadow mixing regions increases from 7 to 19, almost 3 time as colorful. In some embodiment, linear motion mechanisms can be used to adjust the spacing between color LEDs to make color shadows move and change colors. A shadow that can move and change colors in this manner, for example, can make a horror movie even scarier.

In some embodiments, a wide beam color mixing light can be placed inside a chandelier light or the like. The crystals can create multicolor shadows on various illumination surfaces. In some embodiments, a wide beam color mixing light can be place inside a multi-holed or nest structures. The structure can create beautiful color shadows on the illumination surfaces. Because it has only one color mixing region, a wide beam color mixing light is a very good choice for creating color contents. In some embodiments, microshutter arrays can be placed over individual color LEDs to pixelize color mixing in a wide beam color mixing light. In some embodiments, liquid crystal attenuator arrays can be placed over individual color LEDs to pixelize color mixing in a wide beam color mixing light. By controlling the color mixing at the pixel level in either type of array, color content such as a colorful flower can be created. In some embodiment, the planar microshutter array or liquid crystal attenuator array can be replaced by arrays on a geodesic structure to mitigate the elongation effect of pixel size for edge pixels.

In some embodiments, color mixing lights have multiple color sources. When an aperture is place over them, multiple color projections of the aperture can be obtained on an illumination surface in some embodiments. In some embodiments, the aperture can be any geometric shape such as circles, triangles, and square, etc. In some embodiments, the shape of the aperture can be the shape of movie characters or favorite animals or other desired object.

In some embodiments, color mixing lights can be controlled by a holographic controller, for example, described in patent PCT/US17/040172 incorporated by reference herein in its entirety comprises a camera, a holographic projector, and a beam steering mechanism. The camera and the holographic projector share the same field of view (FOV). The beam steering mechanism steers the FOV to the user to view the hologram. The holographic projector can project a control panel hologram to the user. The user can use hand gestures to activate various commands on the holographic control panel on some embodiments, color mixing lights can be controlled using the control panel on the lights. In some embodiments, color mixing lights can be controlled by remote controls and mobile devices.

Figure 1B:
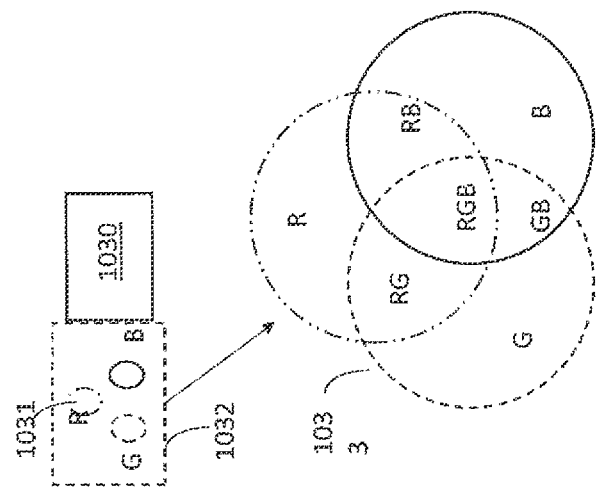
FIGS. 1A and 1B are drawings describing systems including narrow beam color mixing and wide beam color mixing arrangements, respectively, in accordance with some embodiments.
Figure 1A:
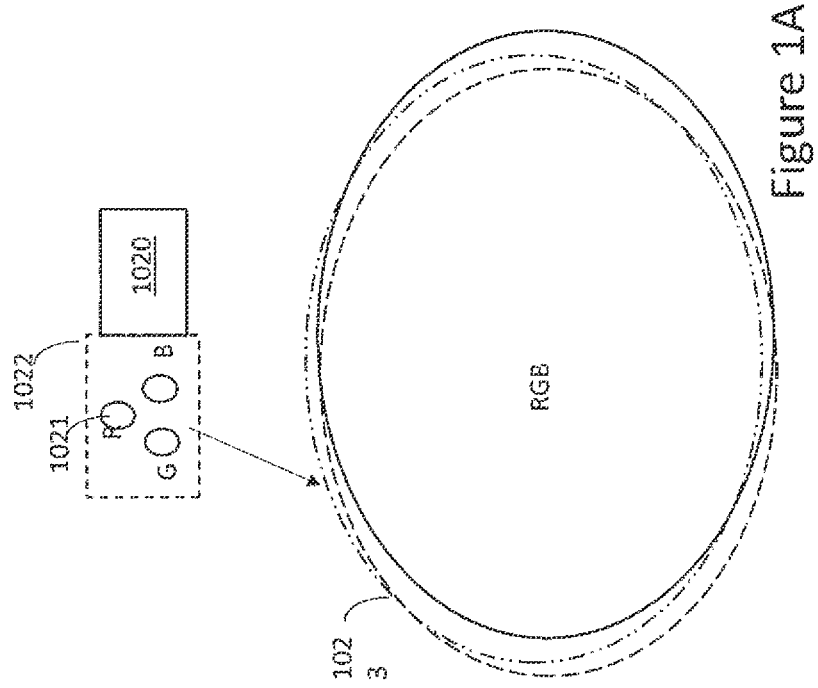

FIGS. 1A and 1B show two types of color mixing schemes 1023 and 1033 generated by a three color light source system 1020 and 1030, respectively. In some embodiments, color light source system 1020 can comprise of RGB light sources 1021 such as LEDs arranged in a triangular configuration and a clear window 1022. The triangle can be an equilateral type or other type. The separation between LEDs is small in comparison to the light beam size at target distance of six feet, 15 times smaller for example. The illumination angle of the LEDs 1021 can be as much as 120°. The output light beams are wide field. Because the small separation, the three color beams almost completely overlap as shown. The color mixing region 1023 is essentially single color except at the edges. In some embodiment, the 3 color light system 1020 can vary their intensities to produce a different output color in the color mixing region 1023 as a color changing light system. Some color changing light systems, for example, a Philips® Hue lighting system, mixes the light rays from all color LEDs inside a light bulb to maximize color mixing. The spatial information of the light source is lost. However, the shadow of an object it is illuminating is dark, and not colorful. In contrast, the color mixing system 1020 mixes the light rays outside a light bulb or the like, in some embodiments. The spatial separation of color light sources 1021 is maintained. Here, the shadow of an object is multicolored. The output color of color mixing system 1020 may be a white or other color, the shadow is multicolored. Thus, the wide beam color mixing light 1020 is a color changing light that can create shadows. In some embodiment, each color LED 1021 can be a single color or multicolor LED comprising of multicolored LED chips. Each LED chip can be independently controlled.

Referring to FIG. 1B, in some embodiments, a lens 1032 can replace the clear window 1022 of FIG. 1A to produce a color mixing light 1030. The lens 1032 can project 3 LEDs 1031 onto an illumination surface producing three color circles. If the LEDs are close enough, the circles will overlap each other to produce color mixing pattern of 1033. In some embodiments, the color circles can be enlarged so they can overlap by defocusing the light sources. Because the beam size is limited by the focal length of the lens, the light beams are usually narrow. The color mixing is narrow beam mixing. Unlike the wide beam color mixing, which provides only one color mixing region, the narrow beam color mixing can provide as many as seven color mixing regions 1033, or more. The RGB three color mixing occurs in the middle or region of overlap of the three color regions R, G, B. Three dual-color mixings RG, RB, and GB occur in region right next to the center region. Three single color colors R, G, and B occur at the outermost regions. In some embodiments, the intensities of color LEDs 1031 can be adjusted to change the colors of the displayed color pattern. In some embodiments, each color LED 1031 can be a single color or multicolor LED comprising of multicolored LED chips or the like. Each LED chip can be independently controlled.

Figure 2:
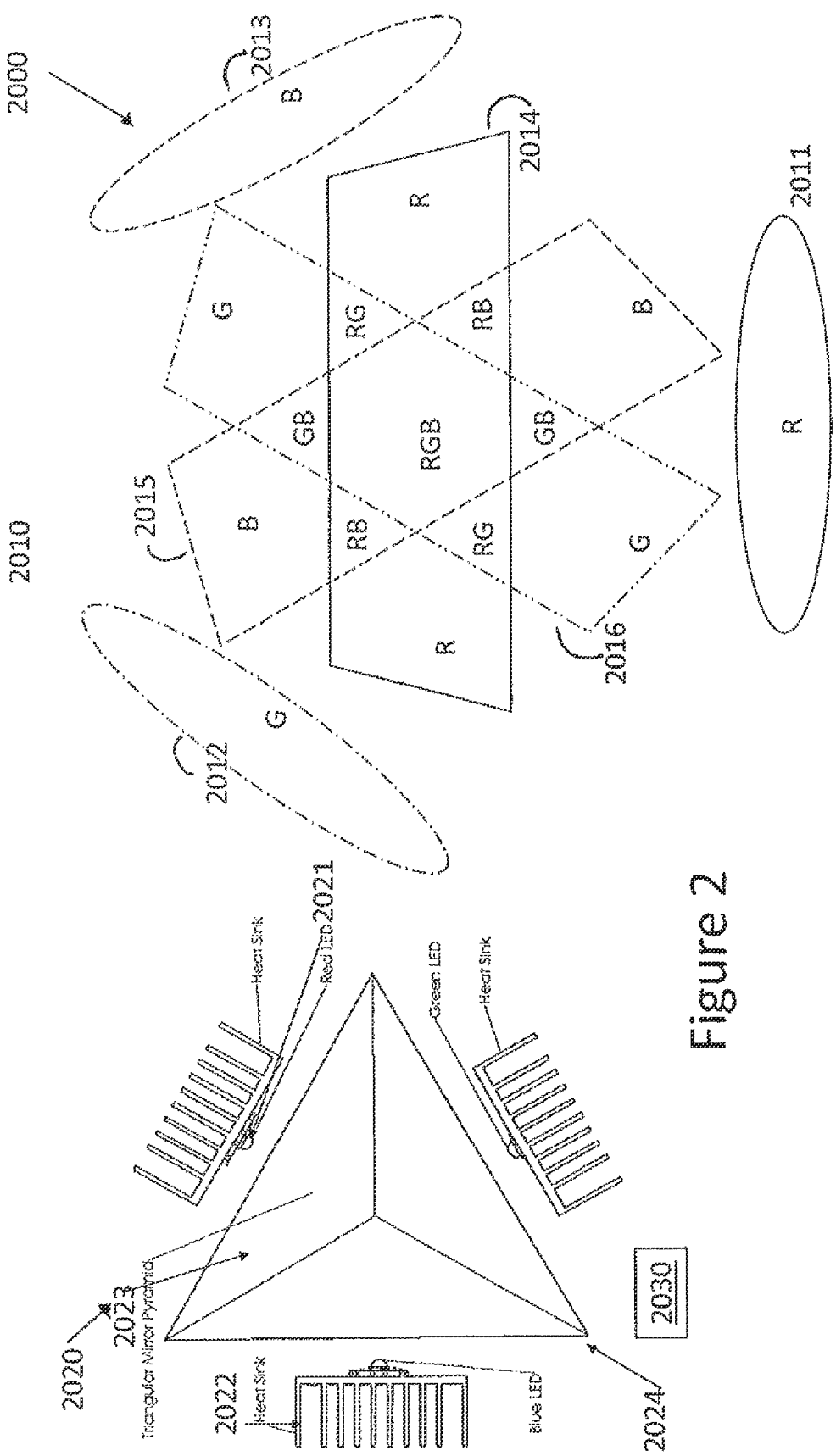
FIG. 2 is a drawing describing a pyramidal mirror assembly for performing a color mixing operation, in accordance with some embodiments.

FIG. 2 illustrates an embodiment of another color mixing scheme. A color mixing light system 2020 includes three light sources 2021 such as RUB LEDs with heatsinks 2022, which can be placed in front of the mirrors 2023 in a three-faced pyramidal mirror assembly 2024 in some embodiments. The color mixing light system 2020 also includes an audio speaker 2030. The angle of the mirrors is 45° so that the chief ray from an LED 2021 is reflected in the vertical direction in some embodiments. The light system 2020 includes no lens. In some embodiments, the color LEDs can be other combinations in lieu of RGB LEDs. The pyramidal mirror assembly divides the light beams front the LEDs into two portions: a first portion that is reflected by the mirrors and a second portion that escapes the mirrors. Unlike the color mixing light 1030 of FIG. 1B, which provides a beam size limited by the focal length of the lens, the reflected light of the light system of 2020 is limited by the size of the mirror because there is no lens involved. The resulting color mixing pattern 2030 is substantially larger than a lens-based configuration due to a wide beam color mixing arrangement.

In some embodiments, the reflections of the three color LEDs 2021 from the three mirrors 2023 produce 3 reflection patterns 2011, 2012, and 2013 oriented 60° from each other. The shape of each reflection pattern is not circular. Its shape is a partial fan shape resembles a trapezoid as illustrated in the left picture of FIG. 20. This is due to the fact that most of the light rays from each LED reflected by the corresponding triangle mirror 2021 occurs near the bottom portion of mirror. There are more and more light rays escape the triangle mirror as moving toward the top mirror vertex. Some light rays are directed above the top of the pyramid. The light rays that escape the mirrors 2021 will end up in outer regions, R, B, and G. These rays come directly from the color LEDs. No color mixing occurs here. When comparing the number of color mixing regions between color mixing pattern 1030 of FIG. 1B and color mixing pattern 2010 of FIG. 2, there are seven color regions in color mixing pattern 1030 and sixteen color regions in color mixing pattern 2010. Thus, the color mixing configuration of color mixing pattern 2020 is not only better in coverage area but also much more colorful than current color mixing configurations.

It is well-known that an LED output intensity is directly proportional to its input current. Accordingly, in some embodiments, the intensities of color LEDs 2021 can be adjusted by using a controller or the like to vary the input currents to the LEDs to change the colors of the color pattern. In some embodiments, a controller that adjusts LED intensity can be a physical dimmer on the control panel on the light casing or a wireless dimmer on a remote control or a slide dimmer executed by a smartphone application or the like. In some embodiments, each color LED 2021 can be a single color or multicolor LED comprising of multicolored LED chips. Each LED chip can be independently controlled. Because the light system 2020 is one type of wide beam color mixing light, some time is desirable to reduce the size of the color pattern. In some embodiment, a Fresnel lens can be place on the exit aperture of the color mixing light to reduce the size of the color pattern.

Color mixing patterns can change in two different ways. The first way is to change the size or structure of the color mixing pattern. This is achieved by either changing the spacing between LEDs for narrow beam color mixing or pivoting the mirrors around 45° position for the pyramidal mirror assembly color mixing configuration. The second way is to change the location of the color mixing pattern. This can be done by beam steering components of the light system that produce the color mixing pattern. For narrow beam color mixing patterns, the pattern can be moved or steered by relative motion between the lens and the 3 color LED assembly. For a light system including a pyramidal mirror assembly, counter-rotating a pair (or Risley prism pair) of Fresnel prisms can be used to steer the color mixing pattern. In some embodiments, the structure size change of the color pattern creates spatial color changes in addition to the stationary color changing by adjusting intensities of various color LEDs. In some embodiments, the motions of color mixing pattern changing, either structure size changing or the whole pattern moving can be used for various applications, for example, for the purpose of entertainment.

Figure 3:
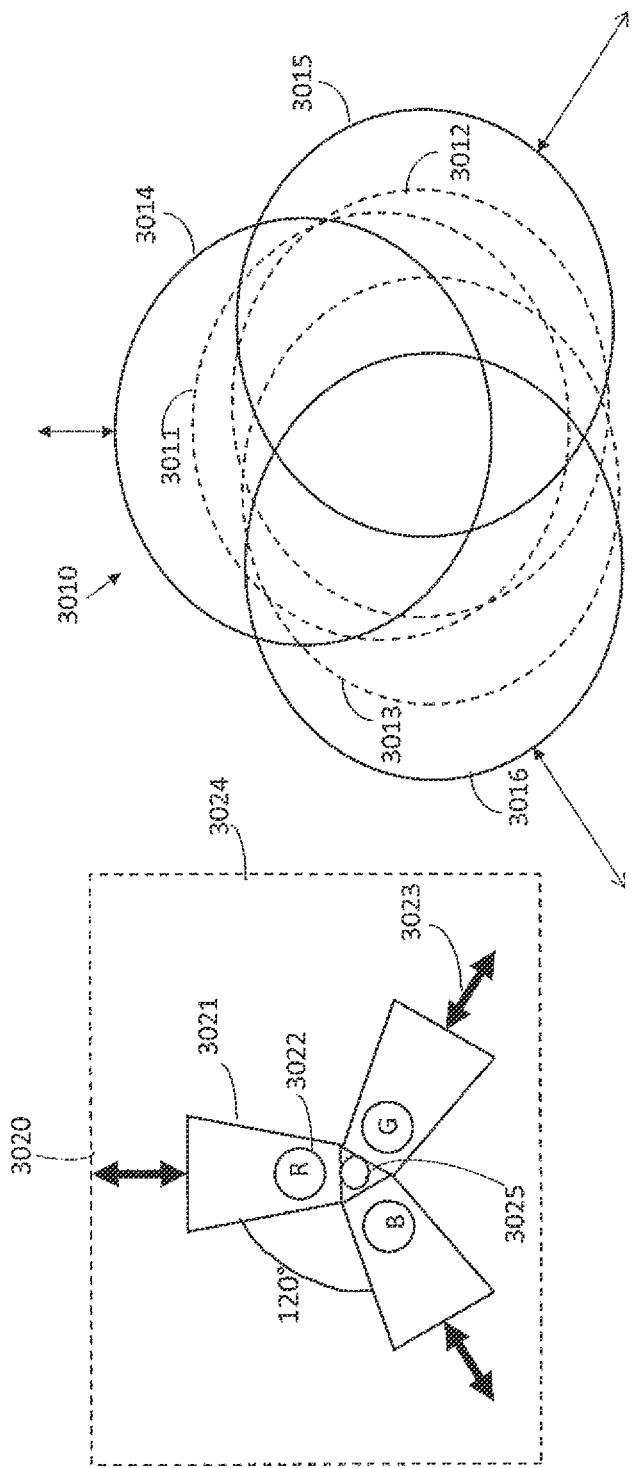
FIG. 3 is a drawing describing how a color mixing pattern is changed by linear motion mechanisms for narrow beam lighting, in accordance with some embodiments.

FIG. 3 shows a color pattern motion driving mechanism 3020 for providing a narrow beam color mixing pattern 3010. The mechanism 3020 can comprise color LEDs 3022 on heatsinks 3021, a lens such as Fresnel lens 3024, and a linear motion mechanism that moves toward or away from the center 3025. In some embodiment the linear motion mechanism can be a motor with a lead screw or the like. In other mechanism, it can be other linear motion driving mechanism. As shown in FIG. 3, the lens 3024 projects the outputs of the RGB LEDs 3022 including three color circles 3011, 3012, and 3013 on an illumination surface where they form color pattern as illustrated by the dotted lines. When the linear motion driving mechanism moves the RGB LEDs outward, the corresponding color circles moves to new positions as illustrated by 3014, 3015, and 3016. The overlap area decreases as the LEDs 3022 move outwards, and the pattern becomes more colorful.

Figure 4:
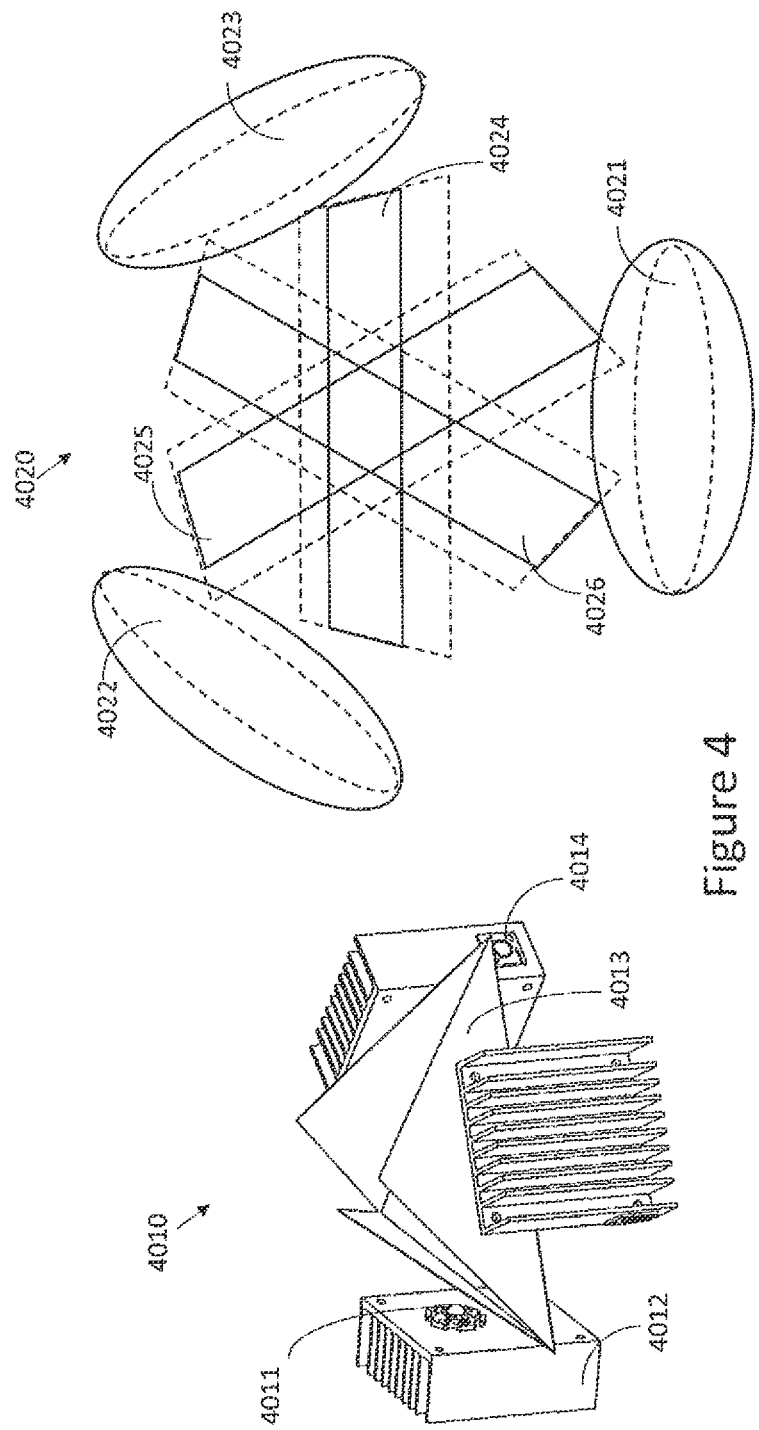
FIG. 4 is a drawing describing how a color mixing pattern is being changed by pivotable mirrors for mixing of colors using a pyramidal mirror assembly, in accordance with some embodiments.

FIG. 4 shows a pyramidal mirror assembly 4010 with pivotable mirrors 4013 for color mixing. In some embodiments, pivotable mirrors 4013 pivot about the 45° angle to redirect light rays from color LEDs 4011 to change the color mixing pattern 4020. In some embodiments, the three color LEDs 4011 can be RGB LEDs. In some embodiment, the three color LEDs can be other colors. In some embodiment, pivotable mirrors can be pivoted by actuators. In some embodiment, pivotable mirrors can be pivoted by motors. In some embodiment, pivotable mirrors can be pivoted by other mechanisms. When pivotable mirrors pivot from 45° to larger angle, more light rays are reflected by the mirrors. The color light regions produced by the mirrors increase as illustrated by the solid line regions. The color light regions produced by light rays that escape mirrors decrease as illustrated by the solid line regions. The dotted line regions are produced by pivotable mirrors at 45°. The beam locations of color mixing pattern 4020 don't change but the beam sizes change. White light sources 4014 can be added to the pyramidal mirror assembly with respect to the color mixing of various light sources.

Figure 5:
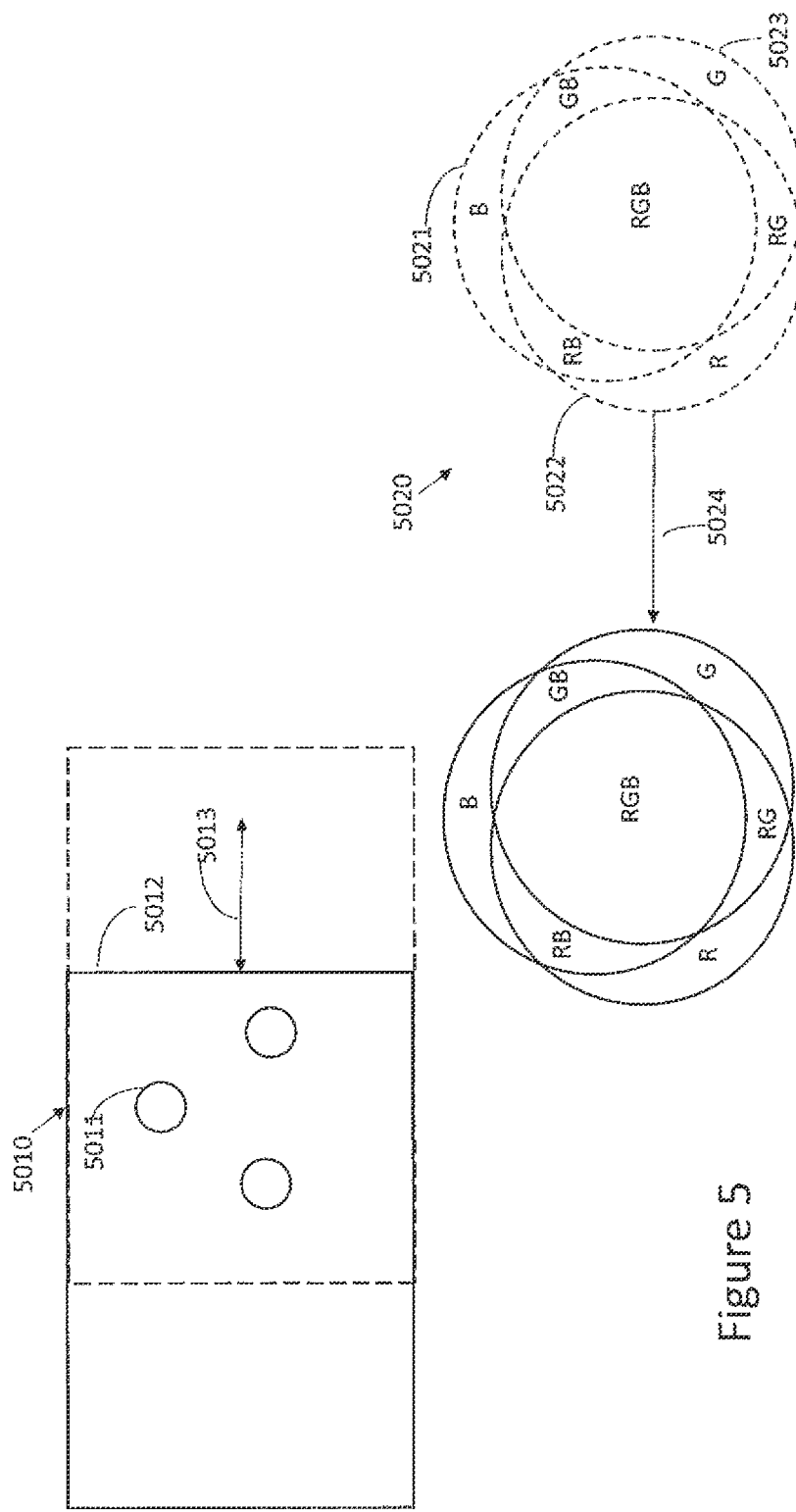
FIG. 5 is a drawing describing beam steering for a narrow beam lighting including color mixing, in accordance with some embodiments.

FIG. 5 shows a beam steering mechanism 5010 for a narrow beam color mixing pattern 5020. It can comprise three color LEDs 5011, a lens such as Fresnel lens 5012, and two orthogonal motorized rails 3013. Only one motorized motion 5013 is shown in the figure for simplicity. Either the lens 5012 or the LED assembly is placed on motorized rails 5013. When the motorized rails 5013 move either the lens 5012 or the LED assembly 5011, the color mixing pattern 5020 moves from the original position (dotted line color circles) to new position (solid line color circles). Beam steering of the color mixing pattern does not change the size of the color circles 5021, 5022, and 5023, or their overlap areas.

In some embodiments, a narrow beam color mixing light comprises three color LEDs such as RGB LEDs with heatsinks, a lens such as Fresnel lens, a linear motion mechanism to drive the LEDs toward and away from a common center of the LEDs to change the overlap area of color mixing regions, a beam steering mechanism to create relative linear motion between the three color LED assembly and the Fresnel lens for steering the color mixing light pattern, electronics, and a power supply to provide power to the electronics, for example, a circuit board or the like that provides control functions with respect to the LED assembly and/or other elements of the system. In some embodiments, the system includes a controller, for example, an electronic circuit board or the like, that controls various operations of the color mixing light including but not limited to individual LED intensity to adjust color mixing ratio, beam steering control, color pattern shape, size, and so on. In some embodiments, the electronics can vary the brightness of individual LED to obtain different color patterns. In some embodiments, an audio device such as a speaker can be added so that music can control the colors of the multicolor pattern. The sound modulations of the music or other audio output can be converted by a conversion apparatus into current inputs to the color LEDs to obtain various color patterns. In some embodiments, the electronics can communicate with a remote device via a network for example, a wired or wireless network. For example, a Bluetooth or WiFi module can be used in the circuit board. It will communicate with the devices with Bluetooth or WiFi modules. In some embodiments, the user can control the narrow beam color mixing light remotely by mobile device using a software application executed on a processor of a personal computing device such as a smartphone, laptop computer, and so on, or remote control using the buttons on its control panel. In some embodiments, the user can control the narrow beam color mixing light using the manual controls on the light. For example, a control panel with dimming buttons and switches can be placed on the casing of the color mixing light for a user to manually control the light. In some embodiments, a user can control the narrow beam color mixing light using a holographic sensor. The holographic projector projects a hologram of a control panel for controlling the color mixing light in the FOV of the holographic sensor. In some embodiment, the buttons on the holographic control panel can be in forms of hand gestures. Seeing it, a user can select the command button he/she wants by showing a hand gesture corresponding to the hand gesture of the command button in some embodiment. The camera in the holographic sensor whose FOV is in the same direction captures the image of the hand gesture and matches with the hand gestures in the gesture library in come embodiment. If there is a match, the button will be activated and the corresponding command will be sent to the color mixing light in some embodiment. Otherwise no action will be taken.

Figure 6:
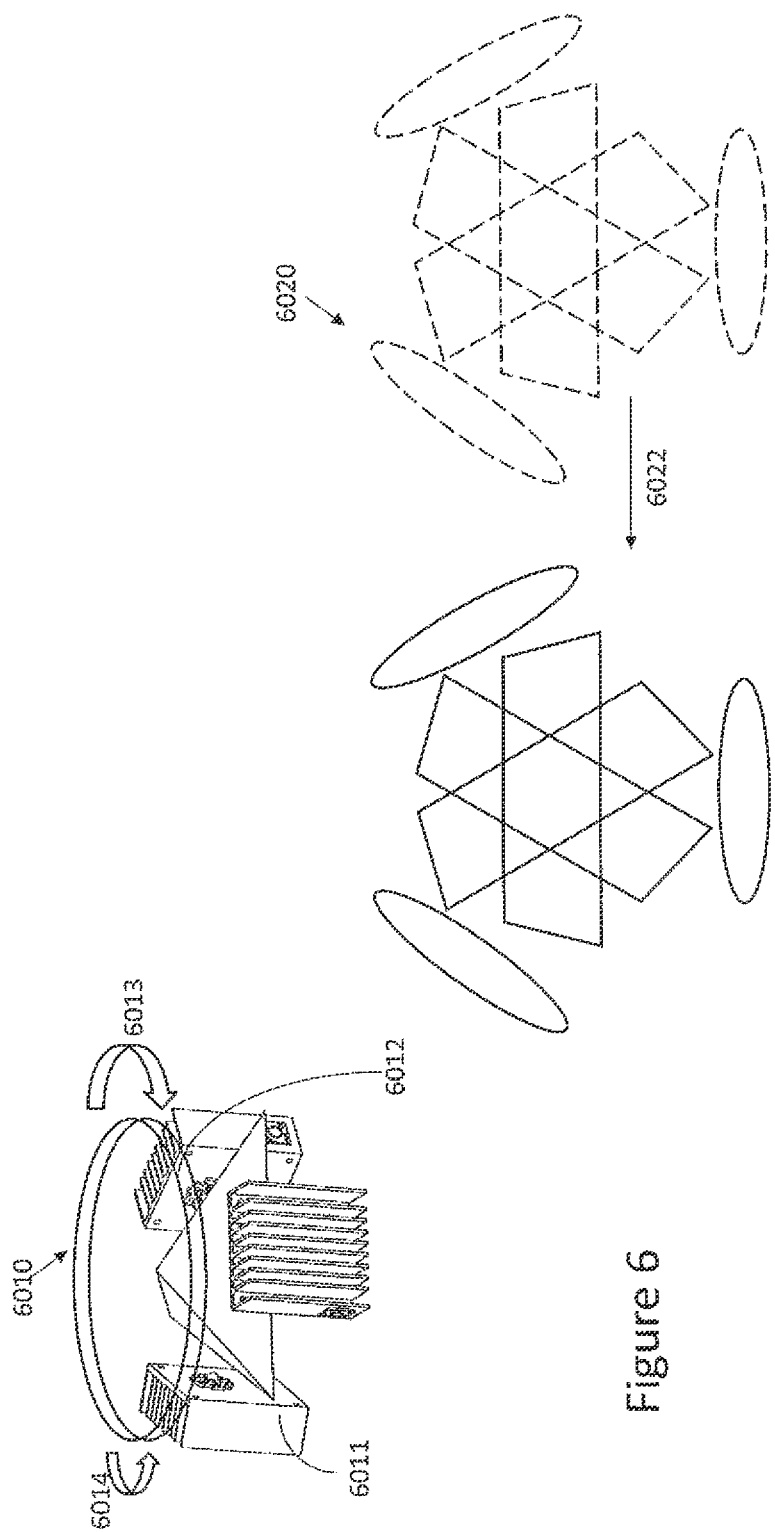
FIG. 6 is a drawing describing beam steering for a pyramidal mirror assembly performing a color mixing operation, in accordance with some embodiments.

FIG. 6 shows a beam steering mechanism 6010 for a pyramidal mirror assembly configuration. It can comprise two Fresnel prisms 6012, a counter-rotating mechanism 6013, and a co-rotation mechanism 6014 in some embodiments. In some embodiments, the beam steering mechanism 6010 is placed on the exit aperture of the pyramid color mixing light assembly 6011. In some embodiments, the counter-rotating mechanism 6013 moves the color mixing pattern 6020 away from the optical axis of 6010 while the co-rotating mechanism 6014 rotates the color mixing pattern 6020 about the optical axis of 6010 in the azimuth direction. This allows the color mixing pattern to move from a location represented by doted lines to a new location represented by solid lines. In some embodiments, the rotating mechanisms 6013 and 6014 can be motorized. In some embodiment, the rotating mechanisms 6013 and 6014 can be manually operated. The beam steering capability allows a user to place the color mixing light 6010 at any location and still able to obtain the color mixing pattern 6020 at the area in sonic embodiment. For example, a user can place the color mixing light 6020 at the corner of a room and nevertheless able to view a display of the color mixing pattern 6020 in the middle ceiling.

In some embodiments, a pyramidal mirror assembly for color mixing light can be constructed by using a three-faced pyramidal mirror, 3 color LEDs such as RGB LEDs, 3 heat sinks for the LEDs, control electronics, a power supply, and a transparent window. In some embodiments, the pyramidal mirror can have more than three-faced mirrors and more than the color LEDs. In some embodiments, the brightness of the color LEDs can be adjusted dynamically so that multicolor mixing pattern can be changed in real time. In some embodiments, white light LEDs can be added to the color mixing light so users can use white light and color light at the same time. In some embodiment, a speaker or other audio device can be added to the color mixing light so that music can be played and control the change of colors. In some embodiment, the mirrors on the pyramid can be pivotable so that the size and colors of the multicolor pattern can be changed. In some embodiments, a pair of Fresnel prisms can be placed on top of the pyramid color mixing light to steer the color mixing light pattern to user's desired position. In some embodiments, the beam steering mechanism can be motorized. In some embodiment, the beam steeling mechanism can be manual. In some embodiments, the control electronics can have dimming control for the color LEDs, wired and wireless control modules, control electronics for the pivotable mirrors, control electronics for the beam steering mechanism. In some embodiments, a user can control pyramidal mirror assembly color mixing light wirelessly using his/her mobile device or a remote control. In some embodiment, a user can control the pyramidal mirror assembly color mixing light manually by using buttons on the control panel on the light. In some embodiments, a user can control the pyramidal mirror assembly color mixing light by using a holographic controller. In some embodiments, a user can use a smart speaker to control the pyramidal mirror assembly color mixing light.

As previously described, a color mixing light can be configured by a lighting system to generate color shadows. Shadows occur because objects block light from light sources. If there are more than one light source shining on an object, there will be multiple shadows. The number of shadows equal to number of light sources. When light sources emit light of different colors, color mixing can occur in shadow regions. In the shadow of a given color light source, there is no light of this color. But there is color light from other color light sources, and they will mix. For example, three RGB color light sources illuminate on an object, in a red light shadow region color light from the green and blue sources are present. Blue light and green light will mix in this region to form a cyan color shadow. Other combinations can be analyzed in a similar fashion. If there are only red and green light sources, green light will be in the red light shadow and red light will be in the green light shadow.

Figure 7:
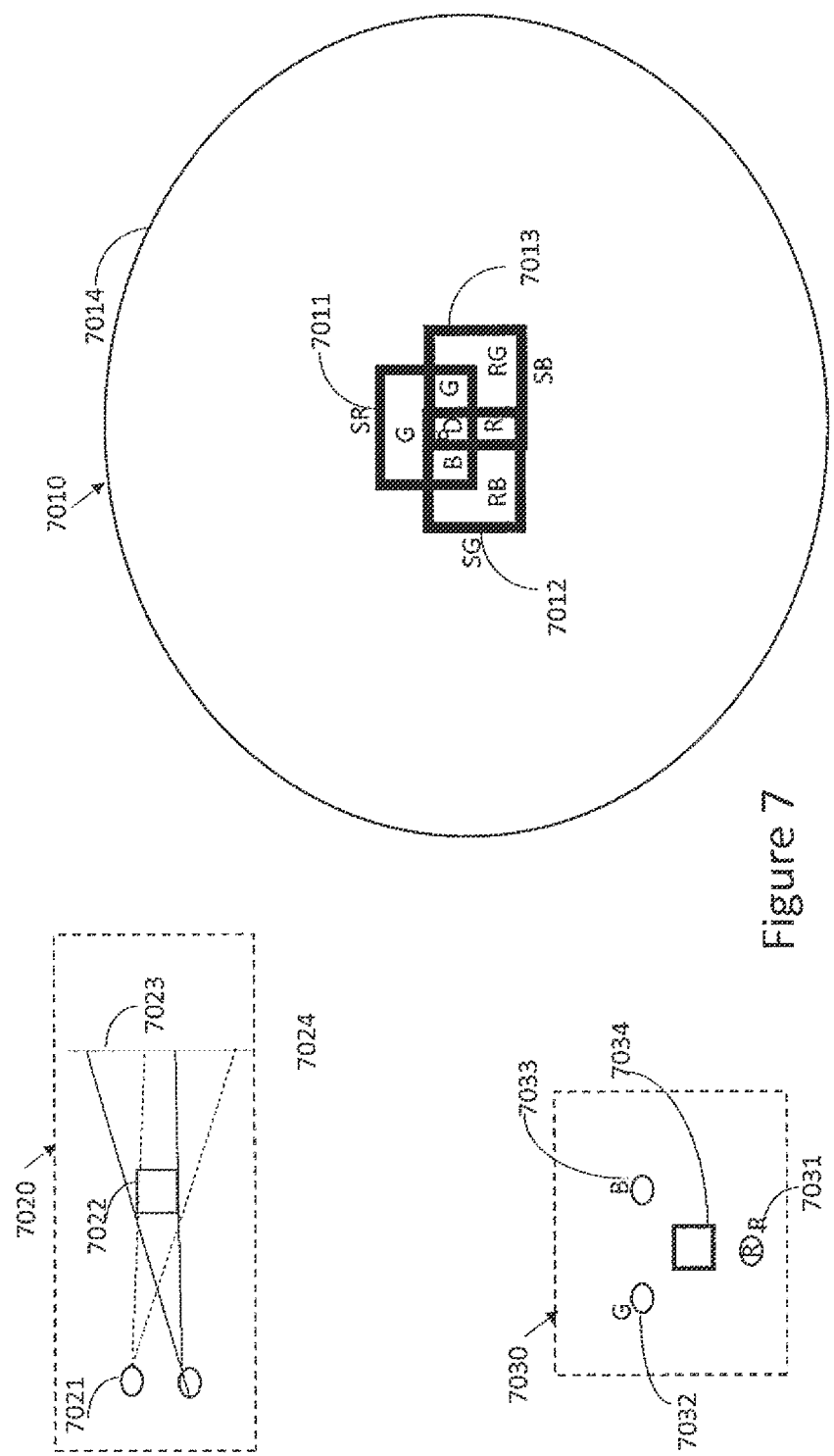
FIG. 7 is a drawing describing of an arrangement for generating a color shadow in a color mixing region, in accordance with some embodiments.

In FIG. 7, color mixing in the shadow regions for an RGB color mixing region 7014 is performed and analyzed. A test setup 7020 can comprise RGB LEDs 7021, an object 7022, and a screen 7024. Color light beams 7023 from RGB LEDs 7021 illuminate on an object 7022. Their shadows are projected on the screen 7024, 7030 is the head-on view of the test set-up. The object 7034 is projected onto the LED plane. The RGB LEDs are 7031, 7032, and 7033, Their corresponding shadows 7011, 7012, and 7013 are displayed on color mixing region 7014 at the screen 7010. As mentioned earlier, colors red, green, and blue are missing in their corresponding shadow regions 7011, 7012, and 7013. Light of other colors are present in their shadows. So blue and green are in shadow region 7011. Red and blue colors are in shadow region 7012. Red and green colors are in shadow region 7013. As can be seen, the shadows have overlap and non-overlap regions. The overlap regions can have two or three color shadows. In two color shadow overlap regions, only one color is present. In three color shadow overlap regions, no color is present. The color of the region is dark. In color shadow non-overlap region, there are two colors present. As can be seen from FIG. 7, seven color shadow overlap regions in the shadows are labelled. They will produce cyan, yellow, magenta on the non-overlap regions, red, green, and blue in the 2 shadows overlap regions, and dark in the 3 shadows overlap region.

FIG. 8 shows a color pattern driving mechanism 8020 similar to FIG. 3 for wide beam color mixing. In some embodiments, the color pattern driving mechanism 8020 can comprise a linear motion device such as a motor with lead screw or the like. In some embodiments, the color pattern driving mechanism can comprise a magnetic driving device. In some embodiments, the color pattern driving mechanism can comprise other driving devices. Because it relates to wide beam color mixing, the color pattern has very little noticeable changes during a motion of one or more LEDs. The color shadow pattern 8011 on the other hand can experience substantial changes. In some embodiments, the linear motion mechanism 8022 moves the color LEDs 8021 along the three directions (for example, relative to a Cartesian coordinate system), forcing a color shadow to change from 8011a (dotted lines) to 8011b (solid lines). The areas of overlap regions also change leading to color changes in the color shadow pattern. In some embodiment, the intensities of three color LEDs can be varied dynamically to produce various mixing colors at the illumination surface. In some embodiment, the shadow of an illuminated object can produce multiple color shadows. In some embodiment, the color pattern driving mechanism can change color shadows dynamically. The wide beam color mixing light not only can change color dynamically, but also create multiple color shadows dynamically. Furthermore, the color shadows can change in size and color. This feature may be beneficial in various applications. For example, this feature will make horror movies even scarier.

In some embodiments, a wide beam color mixing light can be constructed using three color sources such as RGB LEDs with heat sinks, 3 linear motion mechanisms, a transparent window, control electronics, a speaker, and a power supply. In some embodiment, the color LEDs and heatsink assemblies can be placed on vertices of a triangle such as equilateral triangle. Although the output is single color mixing light, the mixing color still carries the LED spatial separation information in the light in some embodiment. In some embodiment, the output light can be used for both illumination and decoration. The color mixing white light can be used for regular illumination. When the color mixing white light illuminates objects of interest, it can create color shadows for decoration or other purpose. In some embodiments, the color LED and heatsink assemblies can be moved back and forth by the linear motion mechanisms to change the color shadows dynamically. In some embodiments, the color LED and heatsink assemblies can be at the vertices of a triangle of fixed side lengths and with no linear motion mechanisms. In some embodiments, the control electronics can comprise LED dimming electronics to adjust the color mixing ratio dynamically, WiFi and Bluetooth modules for communicating wirelessly to a control device, a speaker electronics for converting music to color lighting modulation. In some embodiments, the wide beam color mixing light can be controlled by a smart speaker such as Amazon's Alexa™. A user can give a voice command to a cloud based voice service such as Amazon Alexa™ by speaking to the audio receiving device that communicates with the voice service. The device, e.g., Alexa™, then outputs the command to the color mixing light for executing the command. In some embodiments, the wide beam color mixing light can be controlled by a remote control by pressing the selected button on the control panel. In some embodiments, the wide beam color mixing light can be controlled by a smartphone or a tablet using a control App. In some embodiments, the wide beam color mixing light can be controlled by a holographic controlled sensor. Examples of operation of control is described with respect to FIG. 5. In some embodiments, a controller includes an electronic circuit that controls the color light sources individually to change colors of the multicolor mixing pattern. Here, a change in the intensity of one color LED will change several colors in the color pattern, for example when you change the red intensity, the color mixing colors RG, RB, and RGB will be affected, but GB will not be affected. In embodiments, there are no pivotable mirrors and beam steering mechanism, the shape and size of the beam does not change.

Figure 9:
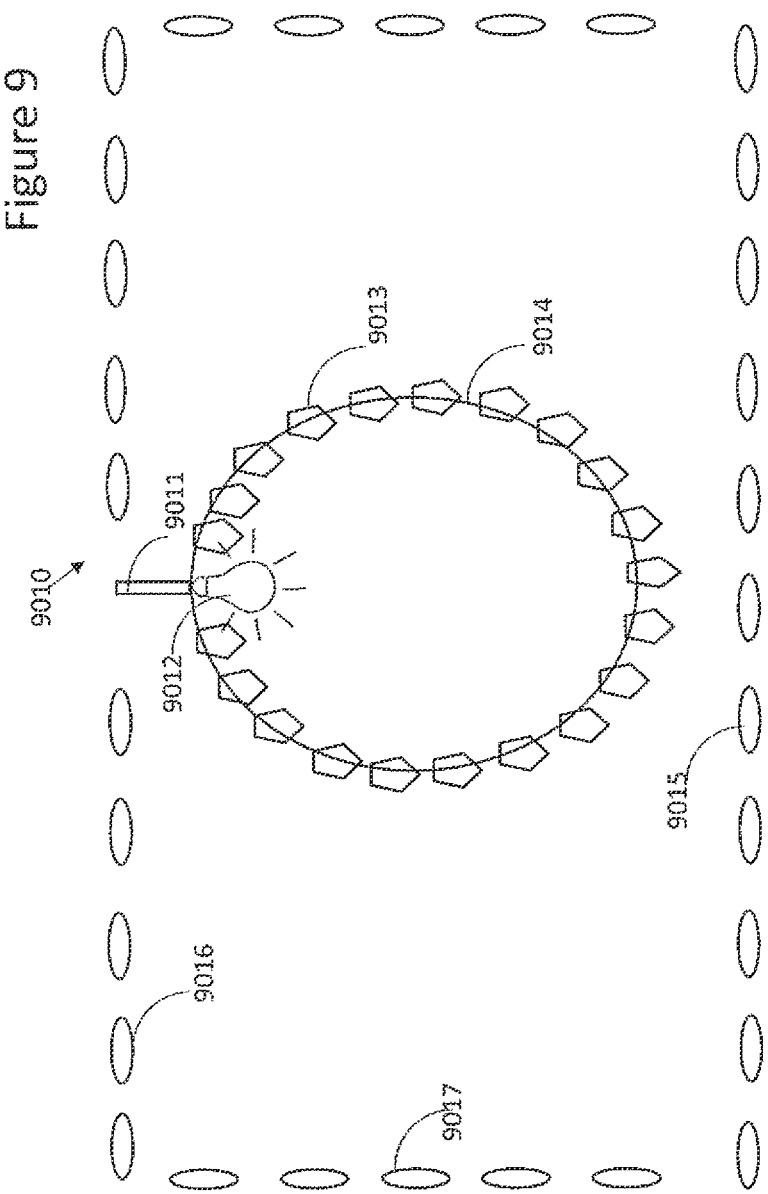
FIG. 9 is a drawing describing an application of a wide beam color mixing operation to a chandelier light, in accordance with some embodiments.

In some embodiment, the properties of color shadow can be exploited in chandelier light or other lights with hole patterns or nest configurations. A chandelier light can comprise light bulbs, crystals, and support frames or the like for attaching the crystals. In some embodiment, a color mixing chandelier light can be constructed by replacing regular light bulbs with the wide beam color mixing lights. FIG. 9 shows a chandelier color mixing light 9010 hanging from a ceiling by a support 9011. A wide beam color mixing light 9012 can be provided. Crystals 9013 are attached to frame support 9014. The color shadows of the crystals are projected onto the floor, wall, and ceiling. They are labelled by 9015, 9016, and 9017 respectively. In some embodiment, the wide beam color mixing light 9010 can be placed inside structure with hole patterns or nest to create color shadows.

In some embodiments, the multiple color sources in a color mixing light can be used to project multicolored images of apertures onto an illumination surface. Each color light source can create one image of the aperture. Because there are multiple color LEDs in a color mixing light, there can be multiple color images of the aperture. In some embodiment, the aperture can be any shape that fits the user's application. It can be general geometric shapes such as circle, ellipse, triangle, square, etc. In some embodiment, the aperture shape can be animals, rockets or other vehicles. In some embodiments, the aperture shape can be movie characters. FIG. 10 shows a circle aperture 10014 and a square aperture 10015 are cut out of a plate 10012. The plate material is opaque in the non-aperture area 10013. Each LED in the pyramidal mirror assembly color mixing light has two light sources: one being reflected by the mirror, the other is the LED itself. In this embodiment, there are a total of six color light sources. There are 6 color circles 10021 and 6 color squares 10022. The pyramidal mirror assembly color mixing light is used in FIG. 10. In some embodiments, the other color mixing lights can be used for this application.

Figure 11:
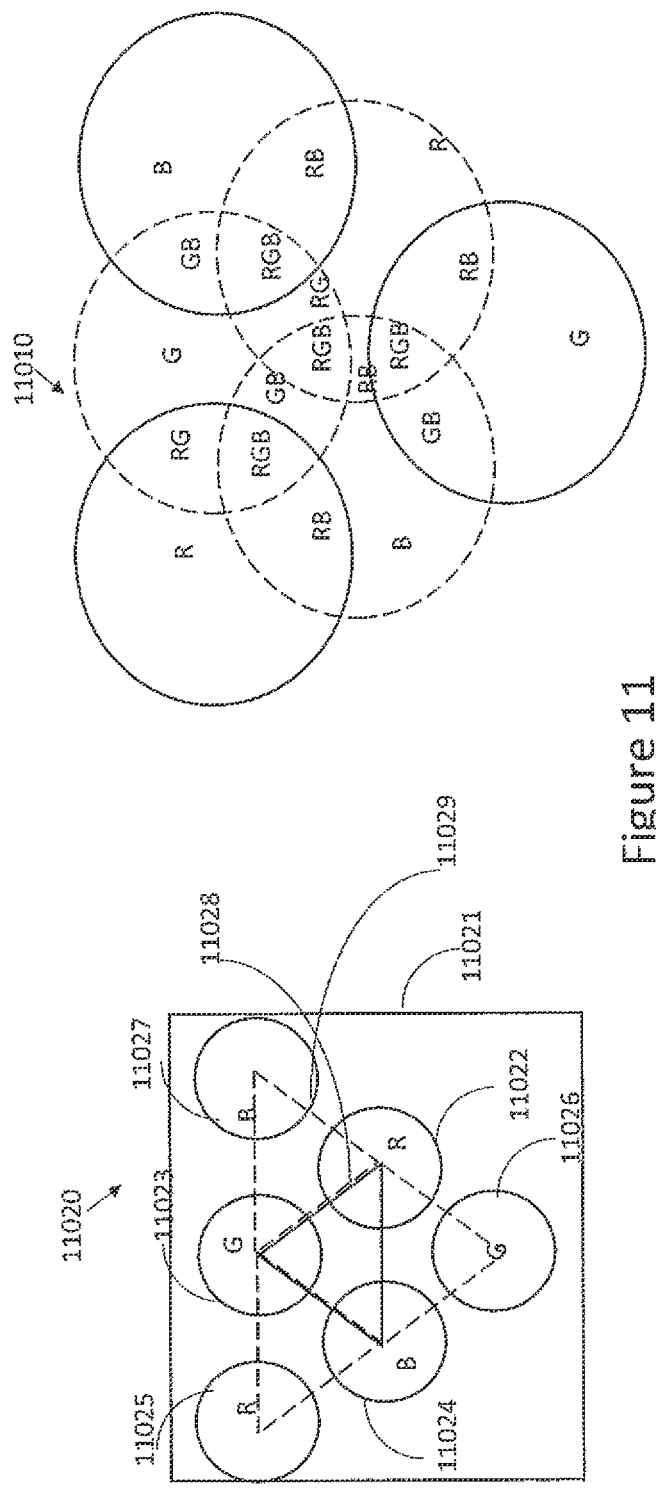
FIG. 11 is a drawing describing color mixing from six different color LED modules in an equilateral triangle mesh configuration, in accordance with some embodiments.

As previously mentioned, in some embodiments, the number of color mixing can be performed for more than three LEDs to produce more colorful mixing patterns and also more colorful color shadows. In FIG. 11, the RGB LED group (11022, 11023, 11024) with a lens such as a Fresnel lens 11021 forms a narrow beam color mixing light with overlapping color mixing circles illustrated by dotted lines in the color mixing pattern 11010. The separation between LEDs is 11028. In some embodiment, 3 more color LEDs such as RGB LEDs can be added to this LED group. The LED separation 11021 is fixed. Three more RGB LED groups (11025, 11023, 11024), (11022, 11026, 11024), and (11022, 11023, 11027) are formed in some embodiments. In some embodiments, the configuration in which the color LEDs are place can be an equilateral triangle mesh. The color LEDs are at the vertices of this mesh. The number of color mixing regions increases from 7 to 19. The color mixing pattern is therefore three times more colorful than a three RGB LEDs configuration.

In some embodiments, the lens 11021 can be replaced by a transparent/clear window to form a wide beam color mixing light. A color pattern formed by four groups of color LEDs is about the same size as the 1 group color LEDs. The color shadow, however, increases its size and number of color shadow mixing regions. The number of color shadows increases from 3 to 6. And the number of color shadow mixing regions increases from 7 to 19. Therefore, the color shadows are almost 3 times more colorful. In some embodiments, the wide beam color mixing light can have six color LEDs instead of three color LEDs as discussed in FIG. 1, FIG. 7, and FIG. 8.

As previously described, color mixing light configurations can be in a triangular arrangement. However, other geometric arrangements can equally apply. In some embodiments, six color LEDs 12021 can be placed on the vertices of a hexagon. The LED separation or hexagon side 12023 is fixed. A lens such as Fresnel lens 12022 is placed over the LEDs to form a narrow beam color mixing light with hexagon color LED configuration in some embodiment. In some embodiment, the colors of six LEDs can include two red LEDs, two green LEDs, and two blue LEDs. In other embodiments, other color LED combinations can be used. Each color LED 12021 projects a color circle 12011 in the illumination surface. The six color circles from the 6 color LEDs overlap to form the color mixing pattern 12010 in some embodiments. The overlap between circles are much more thorough than 11010 in FIG. 11. The number of color regions increases from 19 to 31. In some embodiment, the wide beam color mixing light of 7030 can use six color LEDs with configuration 11020.

In some embodiments, a lens 12022 can be replaced by a clear/transparent window, and the narrow beam color mixing light become a wide beam color mixing light with 6 color LEDs in a hexagon arrangement. The color mixing region is almost the same as the color region produced by three color LEDs because the LED illumination is wide field. Although the number of color shadow regions increases to 31 over the 3 colored LED configuration of 11020, most of these color regions has 3rd order or higher color shadow mixing. Color shadow mixing of order higher than 2 are dark regions. So this configuration is not good for color shadow effect.

Figure 12:
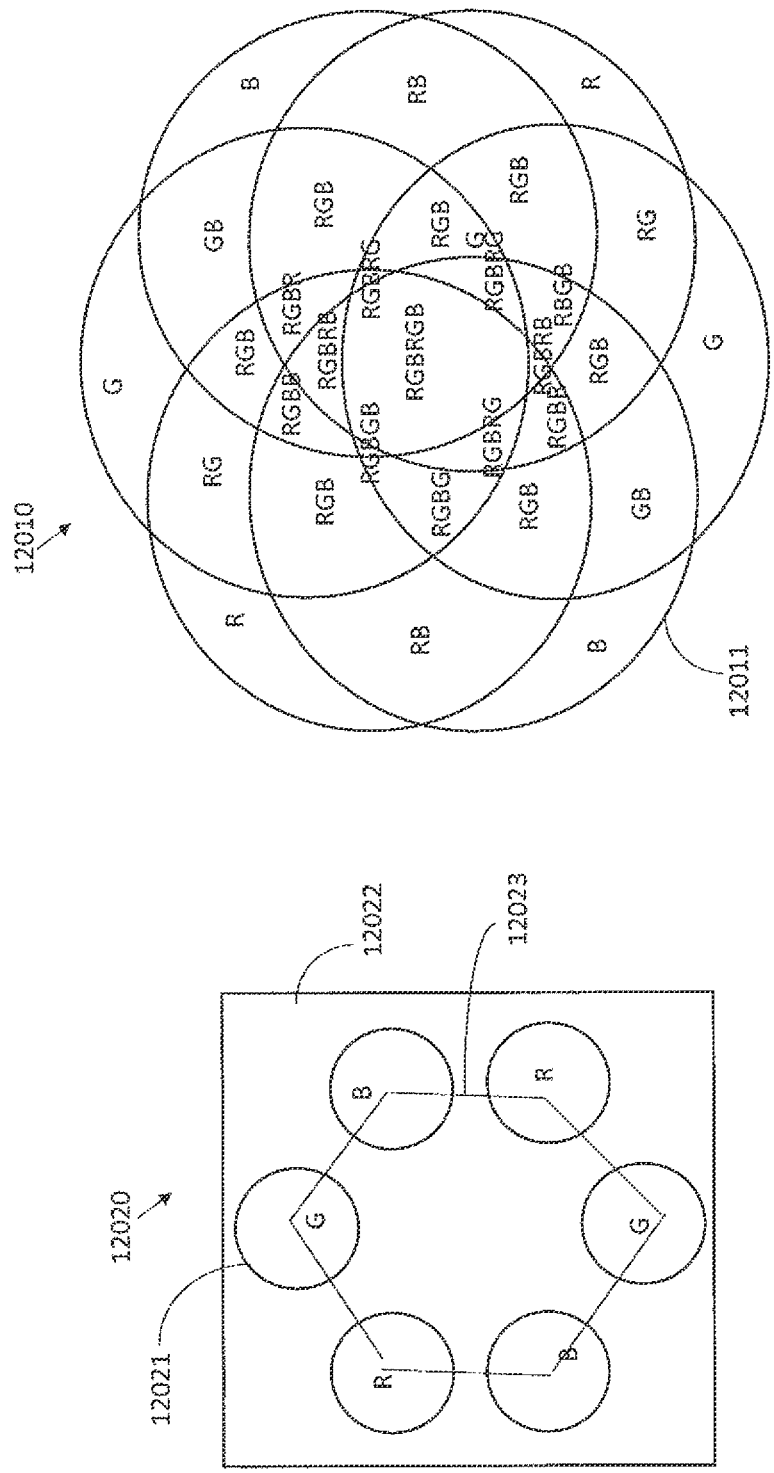
FIG. 12 is a drawing describing color mixing from six different color modules in a hexagon configuration, in accordance with some embodiments.

As described herein, a pyramidal mirror assembly can have three faces for three color LEDs. In other embodiments, a pyramidal mirror assembly with more mirrors can be used. For example, in FIG. 13, a 6-faced pyramidal mirror assembly 13012 with six color LEDs 13011 are used to construct a pyramid color mixing light 13010. The six mirrors produce six reflection patterns from six color LEDs 13021. As shown in FIG. 2, the reflection patterns 13021 are partial fan shapes approximately trapezoids. In some embodiments, the six reflection patterns overlap to produce color mixing regions. As also shown, the color light rays that escape mirrors form color regions 13022 outside the mirror color mixing regions 13021 in some embodiments. The six color regions 13022 also overlap with each other to form color mixing regions. The total number of color regions for the six-faced pyramid color mixing light is 53. This is 1.7 time more colorful than the hexagon color mixing configuration 12020 of FIG. 12. It is 3.3 times more colorful than a three-face pyramid color mixing configuration.

Although color mixing lights create multicolor pattern, color contents cannot be obtained in a control manner. For example, it is not possible to obtain a color flower by using any of the multicolor mixing lights. In some embodiment, color contents can be created by pixelize the color mixing regions. In some embodiments, color mixing of each pixelized region can be controlled individually. This can be achieved by MEMS mirror arrays, microshutter arrays, liquid crystal attenuator arrays, and/or other light attenuator arrays. In order to control the color intensity for each pixel, pixelization must be performed for each color light source individually in some embodiment.

Figure 14:
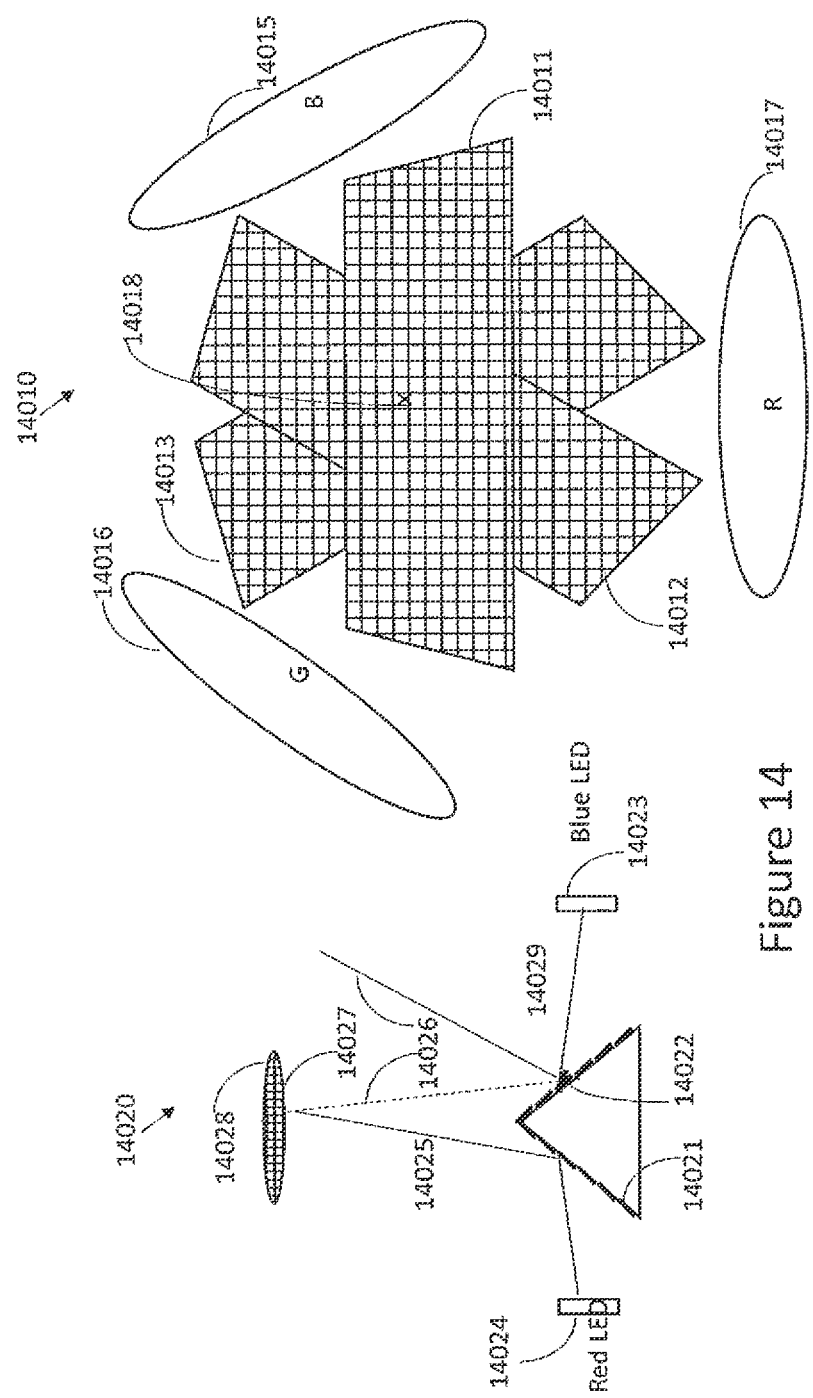
FIG. 14 is a drawing describing a pixelization of color mixing at a pyramidal mirror assembly using Micro-Electro-Mechanical Systems (MEMS) mirror arrays, in accordance with some embodiments.

In some embodiments, a plurality of MEMS mirror arrays 14021 can replace the mirrors in a pyramidal mirror assembly color mixing light as illustrated in FIG. 14. The three MEMS arrays 14021 shown in FIG. 4 can be projected by the three color LEDs onto the illumination surface 14010. The projected images of three MEMS mirror arrays 14011, 14012, and 14013 are shown in FIG. 14. These pixelized color images will participate in color mixing in the overlap regions. There are no pixelized color images in the outer color light regions 14015, 14016, and 14017 because these are regions where light rays escape the mirror arrays. Because of the projected MEMS images are at different orientations, alignments of pixels between array images through calibration is needed in some embodiment. In some embodiment the calibration identifies the MEMS mirror set from the three MEMS mirrors that reflect light to a given pixel on the illumination surface 14010. To control the color mixing of this pixel on the illumination surface 14027 or 14018, a MEMS mirror 14022 can rotate to steer blue light rays 14026 from pixel 14027 or 14018. The original direction of 14026 was dotted line. The new direction is solid line. Light ray 14026 was to color mix with red light ray 14025 at pixel 14027 or 14018. Because there is less blue light in pixel 14018, its color become yellow (red plus green). Using the same method, different colors can be obtained in different pixels. In some embodiment, color content such as a color flower can be created by controlling the color mixing of individual pixel in the illumination surface by using the MEMS arrays in the pyramidal mirror assembly color mixing light.

Figure 15:
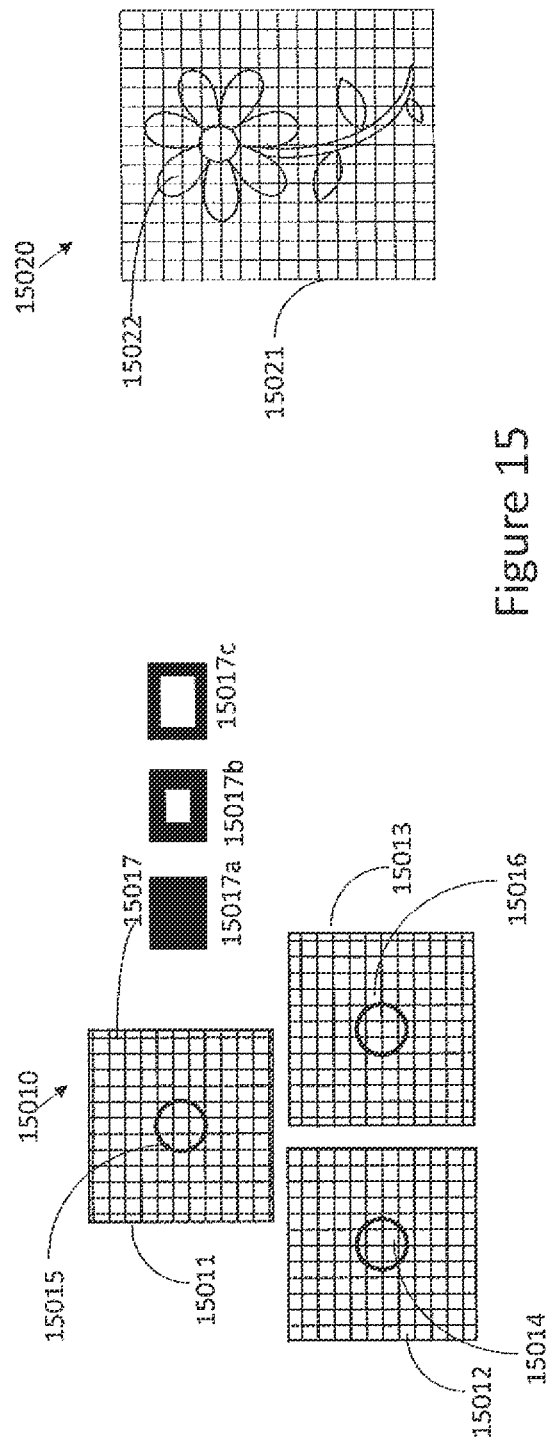
FIG. 15 is a drawing describing a pixelization of color mixing at a wide beam arrangement using microshutter arrays, in accordance with some embodiments.

In some embodiments, microshutter arrays or the like can be positioned at, e.g., placed on, the color LEDs for pixelized color mixing. A microshutter operates in a similar or same way as a camera shutter. Its aperture can be opened from 0% to 100%. It has three states: full opened 15017c, partially opened 15017b, and fully closed 15017a. The microshutter array is a collection of microshutters arranged in a planar format. Each microshutter in the array can be controlled individually. For example, FIG. 15 shows three microshutter arrays 15011, 15012, and 15013 placed over three color LEDs 15014, 15015, and 15016 to perform a color mixing operation. The color mixing of emitted light can include a narrow beam color light or wide beam color mixing light. The 3 microshutter arrays pixelize the outgoing beam patterns for the three color LEDs. The images of the 3 microshutter arrays 15021 are projected onto an illumination surface where they will perform color mixing. Microshutter array images 15021 only pertain to a wide beam color mixing configuration. These color images will partially overlap for the narrow beam color mixing case. The offsets among microshutter arrays are neglected. The offsets can be calibrated by using a camera or related sensor that processes captured images of pixels from various microshutter arrays in some embodiments.

Figure 15A:
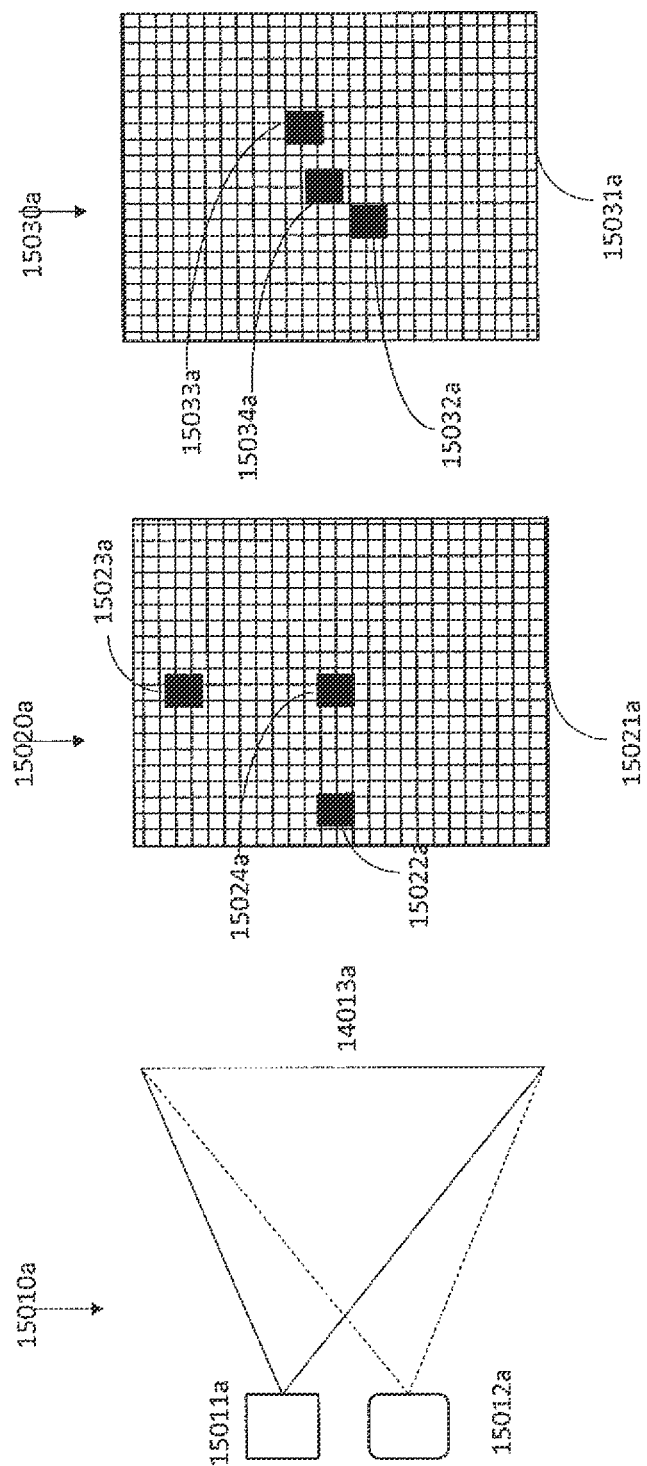
FIG. 15A is a drawing describing the offset calibration among microshutter arrays for a wide beam color mixing light, in accordance with some embodiments.

An example of an offset calibration technique performed by embodiments of a color mixing system is illustrated in FIG. 15A, which includes a calibration setup 15010a. A wide beam color mixing light 15011a can comprise three pixelized color light modules similar to those of a pixelized color mixing light 25020 illustrated in FIG. 25. Each pixelized color light module can comprise of a color light source and a microshutter array. The three pixelized color modules of the color mixing light 15011a are illuminating at the screen 15013a form three pixelized color images similar to the three images 25030 shown in FIG. 25. There are offsets among these three images causing the shifts relative to each other from among these images. To obtain these offsets so that the images can be re-aligned, a color camera 15012a is placed next to the color mixing light 15011a to capture the reflected images of the illumination from the pixelized color light modules. The center pixel is identified for all three microshutter arrays and the distance from each other is measured to obtain the offsets, for example, by executing color mixing techniques according to embodiments herein. The red light module is turned on first. All microshutters are closed except the center pixel 15024a and two other pixels 15022*a* and 15023*a*. Three bright spots are on the illumination surface. A first camera image is taken of these three pixels. The locations of these three microshutter pixels 15022*a*, 15023*a*, and 15024*a* are identified in the camera image. Next all microshutters are opened in the red light module and only the center microshutter is opened for both green and blue light modules. On the illumination surface is a red image with two spots of different colors 15032*a* (yellow obtained from red and green) and 15033*a* (magenta obtained from red and blue). These two spots are the center pixels of the green and blue light modules. A second image of the illumination surface is taken to obtain the camera image locations of these two color spots. We know the image location of the center pixel for the red light module. A pixel 15034*a* is on the camera image as shown in 15030*a*. The image distance is measured among the three center pixels. In order to convert image distance to microshutter distance, the distance calibration is determined between the camera and microshutter array. The calibration coefficients in the x and y directions are $$C_x = \frac{p_{15022a} - p_{15024a}}{i_{15022a} - i_{15024a}}, C_y = \frac{p_{15023a} - p_{15024a}}{i_{15023a} - i_{15024a}}.$$

The offsets between the red and the green are $O_{x=C_xA_x}^{RG}$, $O_{y=C_yA_y}^{RG}$, $O_{x=C_xA_x}^{RB}$, $O_{y=C_yA_y}^{RB}$, where p and i are microshuter array pixel and camera pixel respectively. Once the microshutter arrays are calibrated, color mixing can be performed at the pixel level. The color intensity of each pixel for a given color can be adjusted by controlling the aperture size of the corresponding microshutter. The mixing color of a flower pixel 15021 can be adjusted by controlling the aperture sizes of the corresponding pixels on the 3 microshutter arrays 15011, 15012, and 15013. The colors of the rest of the flower can be obtained in a similar manner.

In some embodiments, a liquid crystal attenuator array can be used to perform pixelized color mixing. The microshutter arrays 15011, 15012, and 15013 in FIG. 15 can be replaced by liquid crystal arrays 16011, 16012, and 16013 in FIG. 16. A liquid crystal pixel 16017 can comprise a liquid crystal phase plate 16017*b*, and a pair of polarizers 16017*a*. The polarizers can be in a cross orientation or parallel orientation. The phase plate 16017*b* can comprise electrodes (16017*b*1 and 16017*b*2) and a liquid crystal cell 16017*b*3. The phase plate 16017*b* changes the phase of a linear polarized when voltage is applied across the electrodes 16017*b*1 and 16017*b*2. When a light beam incident on a liquid crystal pixel, one of the polarizers 16017*a* let only linear polarized light with polarization parallel to the axis of the first 16017*a* through. The phase plate 16017*b* changes the phase of the linear polarized light. This rotates the polarization of the light. The amount of light that can pass through the second polarizer depending on the cosine of the angle between the light polarization and the polarization axis of the second polarizer. By controlling the voltage, the amount of light going through each pixel can be controlled. Therefore, pixelized color mixing can be obtained. Using a similar approach taken as described in FIG. 15, color content can be produced for objects such as a color flower using a narrow beam or wide beam with respect to color mixing from various light sources.

Figure 16:
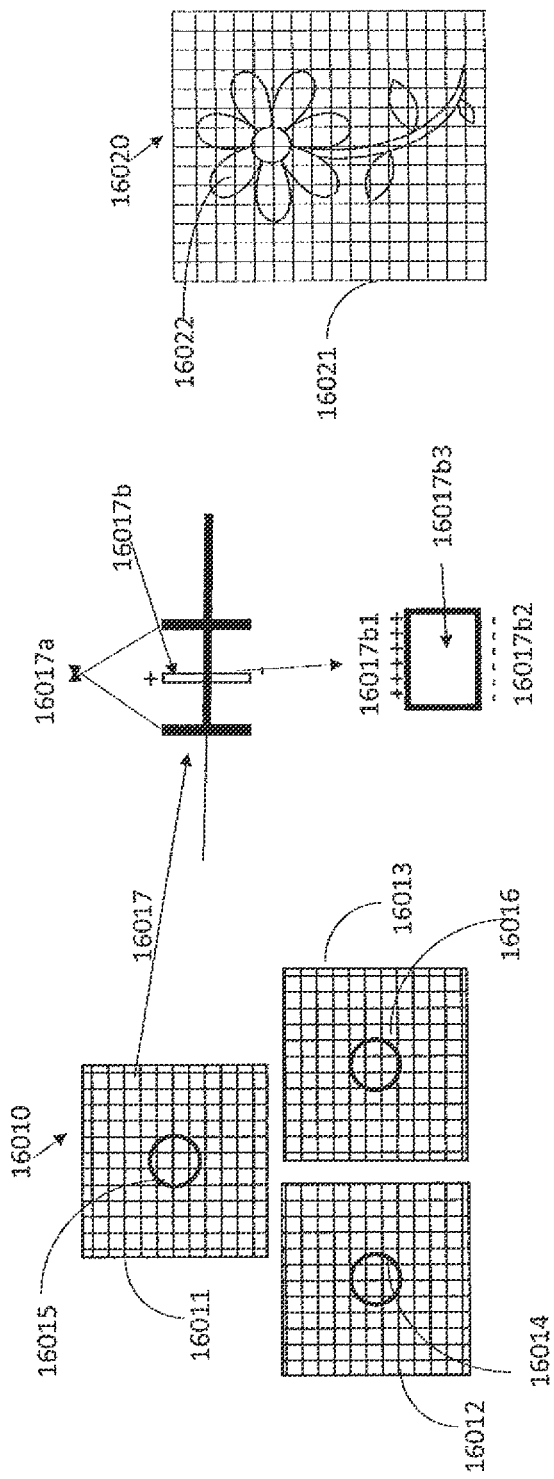
FIG. 16 is a drawing describing a pixelization of color mixing at a wide beam arrangement using liquid crystal attenuator arrays, in accordance with some embodiments.

In FIG. 15 and FIG. 16, the microshutter array and liquid crystal attenuator array, respectively, have planar geometries. In other embodiments, for example, illustrated in FIG. 17 a microshutter array 17012 is placed over a color light source 17011. The required pixel size for the same angular resolution varies as $1/\cos^2\theta$, where θ is the angle between the pixel location vector 17016 and the optical axis 17015 of the light source 17011. For center pixels 17013 near the optical axis 17015 of the light source 17011, the variation is small. For pixels 17014 far away from the optical axis of the light source, the required pixel size can be large. If θ=60°, the required pixel size is 4 times that of the pixels near the light source. In some embodiment, a microshutter array or a liquid crystal attenuator array can be constructed on a geodesic dome structure 17022. The pixels 17023 can be placed on the geodesic dome. In a sphere, an angle can be evenly divided. The required pixel size of any pixel 17023 on the geodesic dome is the same as pixel 17024 at other place. In some embodiment, color LEDs 17021 can be placed on the centers of a geodesic microshutter arrays or geodesic liquid crystal attenuator arrays for color mixing lights. In some embodiments, the geodesic microshutter arrays or the geodesic liquid crystal attenuator arrays or other geodesic light attenuator arrays can be placed over the light sources of all color mixing lights mentioned above including pyramidal mirror assembly color mixing light to create color contents.

In some embodiments, for example, shown in FIG. 18, a holographic controller 18000 can be applied, for example, described in patent PCT/US17/40172. The holographic controller 18000 can comprise, but not be limited to, a holographic projection device 18001, a camera 18002, and a beam splitter 18003. The camera field of view (FOV) direction and projection direction of the projection device are orthogonal to each other. The beam splitter 18003 bisects these two directions and bring the camera FOV and holographic projector FOV together in the same direction. In some embodiments, a beam steeling mechanism 18011 can be used to shift the direction of the FOV of the holographic controller so that the user can easily view the hologram 18006. In some embodiments, the beam steering mechanism is simply a Fresnel prism. The hologram can be seen at a fixed vertical angle Θ. A motor can rotate the Fresnel prism so that the user can see the hologram at other azimuth angles. Different users may be of different heights. The fixed vertical angle only allows people of the right height see the hologram easily. Other people of different heights may have a difficult time viewing it. In some embodiments, the beam steering mechanism 18011 can be a pair of Fresnel prisms called Risley prism pair that allows the user to change the direction of the hologram both vertically and azimuthally. This allows users of different height to view the hologram in different azimuth position. The Fresnel prism pair beam steering mechanism is also shown in FIG. 6. Counter rotation of the prism pair can change the vertical angle, and co-rotation of the prism pair can change the azimuth angle. In some embodiments, the control panel of the color mixing light is placed in the hologram. In some embodiments, the control panel comprises of buttons of various hand gestures 18006. The user 18007 can 'touch' the command button by making a hand gesture that matches the hand gesture of the corresponding button to generate a command in some embodiment. When the hand gesture 18008 is placed at the command button, the camera 18002 captures the image and send it to a processor or cloud for processing. The captured image is compared to the stored hand gestures in a hand gesture library for command coded gesture. When a match is determined, a command is sent to the device under control 18010 via the wireless network 18009. In some embodiments, the camera 18002 in FIG. 18 can be a non-contact controller in U.S. Pat. No. 9,423,879. The beamsplitter 18003 and the window must be thermal transmissive. The holographic control panel will be array of control spots. User's hand can 'touch' the selected control spot to activate that command.

In some embodiments, multicolor mixing lights described in this invention can be controlled on the control panel mounted on the light casings. In some embodiments, the multicolor mixing lights can be control wirelessly by remote control or mobile devices through the wireless network. In some embodiments, the multicolor mixing lights can be controlled by smart speakers or related audio devices. In some embodiment, the multicolor mixing lights can be controlled by holographic controller discussed above. In some embodiment, the multicolor mixing lights can be controlled by other hand gesture controllers or the like. Embodiments of multicolor mixing lights are not limited to those described herein. Accordingly, other applications of multicolor mixing lights in accordance with some embodiments may equally apply.

Figure 25:
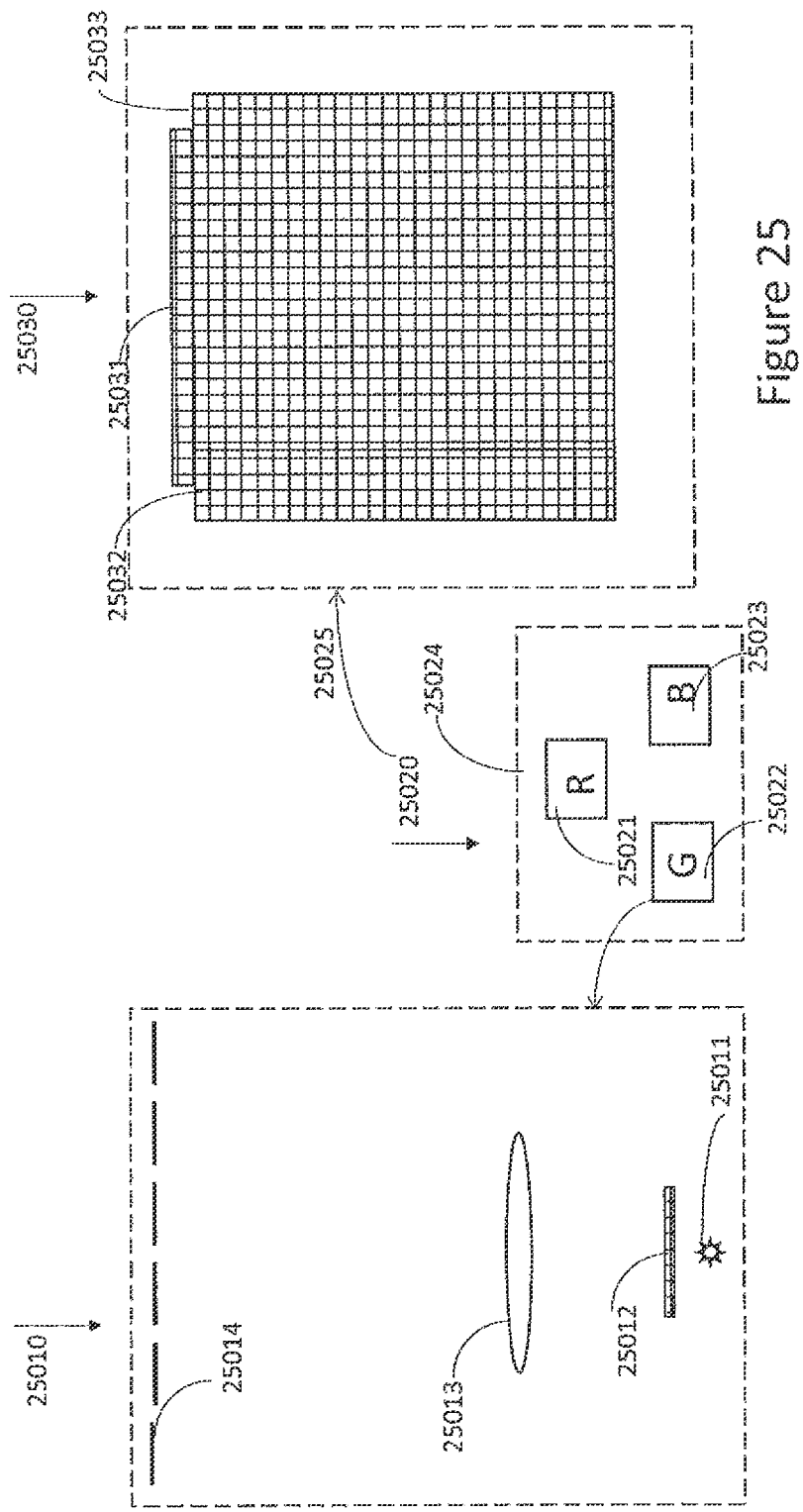
FIG. 25 is a drawing describing a pixelization process of a color mixing light based on three pixelized color light modules, in accordance with some embodiments.

In some embodiments, a pixelized color mixing light 25020 can comprise of three pixelized color light modules (25021, 25022, 25023), an electronic circuit board for controlling the operations of the color mixing light, and a clear window 25024 in a compact device as illustrated in FIG. 25. Each of pixelized color light module (25021, 25022, or 25023) can comprise a color light source 25011, a microshutter array 25012, and a lens 25013 in some embodiment. In some embodiment, the three color light sources in the color light module can be red, green, and blue. In some embodiment, other color combinations can be employed. The color light source 25011 creates a mini light source at each pixel of the microshutter array 25012 in some embodiments. The lens 25013 project this array of mini color light sources onto an illumination surface in some embodiment. A color projection 25014 is on the illumination surface. Because each microshutter can be controlled to open from 0% to 100%, the amount of light through each pixel can be controlled in some embodiment. When all color light modules are in operation, it will create three pixelized color projections 25031, 25032, and 25033 in some embodiment. The three pixelized color projections overlap with some shifts among them. The color projections will mix on pixel to pixel basis in some embodiment. For example, a pixel image with location (0,0) from 25031, a pixel image with location (2, −2) from 25032, and a pixel image with location (−2, −2) from 25033 can fall on the same location, mix, and form a new color on the illumination surface. In some embodiment, by controlling the aperture size of the corresponding pixels, the amount of light through each of these pixels therefore the color mixing ratio can be adjusted at this pixelized location. By controlling the color mixing for each pixel, we can create color image of anything in some embodiment. The image shifts can be calibrated the out using the procedure described in FIG. 15A.

In some embodiments, the color LED sources 25011 and microshutter arrays 25012 can be replaced by color LED source arrays. A color LED array can comprise a plurality of LED pixels arranged in a planar format. The output of each pixel can be controlled individually. The three color images in 25030 will be from three color LED arrays instead of microshutter arrays. Color mixing can be performed at a pixel level by varying color light intensities of the corresponding pixels from the three color light modules in same manner as above. As previously described in FIG. 14, MEMS mirror arrays are used for color pixelization in pyramidal mirror assembly color mixing light. In some embodiments, the color pixelization can occur at the light source. In some embodiment, the color light sources in FIG. 2 can be replaced by the color light source modules of FIG. 25. A color light source module can comprise of a lens, a color light source, and a microshutter array in some embodiment. In other embodiment, a color light source module can comprise of a lens, a color LED array.

In a pyramidal mirror assembly for color mixing light, the light beams from the color LEDs fall into two portions: a portion that is reflected by the mirrors and a portion that is not reflected by the mirrors. The portion that escape the mirrors is at the outer region of the color pattern. The well-known characteristics of light may result in this portion extending a significant distance beyond the pyramidal mirrors. In some embodiments, the system permits this portion of light to be closer to the center region which in turn results in a more colorful pattern or color display on a surface. In some embodiments, as shown in FIG. 26, outer mirrors are added to redirect this portion of light beam toward the center. More specifically, at least one outer mirror 26012 is added to the original light assembly comprising of a pyramid mirror 26011 and color LED light sources 26013. Light beam 26014 is reflected into the center region 26016 by the pyramid mirror. Light beam 26015 escapes the pyramid mirror would have gone further outside is now reflected by outer mirror 26012 to an outer region 26017 closer to the center region. Accordingly, the presence of outer mirrors in addition to a pyramidal mirror assembly color mixing light results in outer or peripheral color regions closer to a center region, in accordance with some embodiments.

What is claimed is:

1. A color mixing light system, comprising:
   a pyramidal mirror assembly comprising three or more mirrors constructed and arranged in a pyramid structure;
   three or more color light source modules, wherein the pyramidal mirror assembly divides the light beams from the color light source modules so that a first portion is reflected by the mirrors and a second portion extends beyond the mirrors to collectively form a multicolor pattern comprising a plurality of overlapping color regions on a surface and create color shadows of illuminated objects on the surface, wherein an output of the three or more color light source modules at the pyramidal mirror assembly produces color mixing for forming the multicolor pattern and the color shadows of the illuminated objects on the surface; and
   an audio speaker for outputting music that controls the multicolor pattern.

2. The color mixing light system of claim 1, further comprising:
   a controller that controls the color mixing light system that forms the multicolor pattern and provides communications between the color mixing light system and at least one remote control mobile device via a wired or wireless network wherein the controller includes an electronic circuit that controls the three or more color light source modules individually to change colors of the multicolor pattern.

3. The color mixing light system of claim 1, further comprising three or more white light source modules added to the pyramidal mirror assembly color mixing light.

4. The color mixing light system of claim 1, further comprising a controller that pivots the mirrors so that a shape, size, intensity, color, or a combination of characteristics of the color mixing pattern can be changed.

5. The color mixing light system of claim 1, wherein the mirrors include Micro-Electro-Mechanical Systems (MEMS) mirror arrays that control a color of an output of the color light source modules at a pixel level.

6. The color mixing light system of claim 1, further comprising a beam steering mechanism for steering the multicolor pattern to a desired position, wherein the beam steering mechanism includes a Fresnel prism pair.

7. The color mixing light system of claim 1, wherein each of the color light source module comprises a lens, a microshutter array, and a color light source.

8. The color mixing light system of claim 1, wherein each of the color light source module comprises a lens and a color LED array.

9. The color mixing light system of claim 1 has an outer mirror that reflects the second portion of the light beams that misses the pyramid mirror assembly toward a center region to increase color mixing regions.

10. The color mixing light system of claim 1, wherein the color mixing light system is controlled by at least one of a wireless device, a holographic controller, or other hand gesture controller device.

11. The color mixing light system of claim 1, further comprising an aperture plate with various aperture shapes placed on an aperture of the color mixing lights to create multicolored projections.

12. A wide beam color mixing light, comprising:
three or more color LED modules with heatsinks;
a clear or transparent window;
a speaker for playing music;
a circuit board that controls an operation of color mixing light emitted by the color LED modules and communicates with users through at least one wired or wireless device; and
a power supply that supplies power to the circuit board, wherein the three or more color LED modules are positioned on vertices of an equilateral triangle mesh configuration, wherein brightnesses of the color LED modules are individually controlled to generate radiation of various mixing color, wherein a task of wide beam color mixing light includes generating the radiation of various mixing color from the color LED modules for illumination, generating color shadows, and creating color contents, wherein the color LED modules and heatsinks are driven by linear motion mechanisms to change their spacings so that the color shadows can move, change shapes and colors dynamically.

13. The wide beam color mixing light of claim 12 constructed and arranged for use in a chandler light to create multicolor shadows from crystals of the chandelier light.

14. The wide beam color mixing light of claim 12, wherein the color LED modules further comprise color LEDs, microshutter arrays, liquid crystal attenuator arrays, or other light attenuator arrays positioned over the color LED modules for generating color contents according to a pixel level color mixing operation.

15. The wide beam color mixing light of claim 12, wherein the color LED modules in the wide beam color mixing light further comprising lenses, color LEDs, microshutter arrays, liquid crystal attenuator arrays, or other light attenuator arrays positioned over the color LEDs for generating color contents according to a pixel level color mixing operation.

16. The wide beam color mixing light of claim 12, wherein the color LED modules in the wide beam color mixing light further comprise lenses and color LED arrays for generating color contents according to a pixel level color mixing operation.

17. A narrow beam color mixing light system, comprising:
three or more color LED modules including heatsinks;
a speaker for playing music;
a clear window;
a beam steering mechanism for steering a multicolor pattern formed by color mixing light emitted by the color LED modules, a narrow beam color mixing; and
a circuit board that controls an operation of the color mixing light, wherein the color LED modules are adjusted individually to create different colors for the multicolor pattern light output provides a steerable, deformable, and color changing multicolor pattern, and color shadows are produced.

18. The narrow beam color mixing light system of claim 17, wherein the color LED modules move back and forth by a linear motion mechanism for changing a shape, color, and size of the multicolor pattern.

19. The narrow beam color mixing light system of claim 17, wherein the color LED modules of the narrow beam color mixing light output further comprises color LEDs, microshutter arrays, liquid crystal attenuator arrays, or other light attenuator arrays positioned over the color LED modules for generating color contents.

20. The narrow beam color mixing light system of claim 17, wherein the color LED modules in the narrow beam color mixing light output further comprises color LED arrays for generating color contents.

\* \* \* \* \*